United States Patent
Higashi et al.

(10) Patent No.: US 11,137,281 B2
(45) Date of Patent: Oct. 5, 2021

(54) SENSOR

(71) Applicant: KABUSHIKI KAISHA TOSHIBA, Tokyo (JP)

(72) Inventors: Yoshihiro Higashi, Ishikawa (JP);
Yoshihiko Fuji, Kanagawa (JP);
Kazuaki Okamoto, Kanagawa (JP);
Shotaro Baba, Kanagawa (JP);
Michiko Hara, Kanagawa (JP)

(73) Assignee: KABUSHIKI KAISHA TOSHIBA, Toyko (JP)

( * ) Notice: Subject to any disclaimer, the term of this patent is extended or adjusted under 35 U.S.C. 154(b) by 102 days.

(21) Appl. No.: 16/281,157

(22) Filed: Feb. 21, 2019

(65) Prior Publication Data
US 2020/0088568 A1    Mar. 19, 2020

(30) Foreign Application Priority Data
Sep. 14, 2018 (JP) .............................. JP2018-172793

(51) Int. Cl.
*G01H 11/02* (2006.01)
*H04R 1/04* (2006.01)

(52) U.S. Cl.
CPC .............. *G01H 11/02* (2013.01); *H04R 1/04* (2013.01)

(58) Field of Classification Search
CPC .................................. G01H 11/02; H04R 1/04
See application file for complete search history.

(56) References Cited

U.S. PATENT DOCUMENTS 5,836,203 A *  11/1998  Martin ...................... B06B 1/04
                                                           73/579
9,176,014 B2 * 11/2015  Fuji .......................... H04R 15/00
9,322,726 B2 *  4/2016  Fukuzawa ............... G01L 1/125
(Continued)

FOREIGN PATENT DOCUMENTS

JP      5946471 B2   7/2016
JP    2017-53723 A   3/2017
JP     2018-6769 A   1/2018

OTHER PUBLICATIONS

Jander et al., "Chopping techniques for low-frequency nanotesla spin-dependent tunneling field sensors," J. Appl. Phys., 93:8382-84 (2003).

*Primary Examiner* — David J Bolduc
(74) *Attorney, Agent, or Firm* — Finnegan, Henderson, Farabow, Garrett & Dunner L.L.P.

(57) ABSTRACT

According to one embodiment, a sensor includes a structure body, an element portion, and a power line. The structure body includes a supporter and a film portion. The film portion is supported by the supporter and includes an end portion. The end portion is aligned with a first direction and supported by the supporter. The element portion includes a first element provided at the film portion. The first element includes a first magnetic layer, a first opposing magnetic layer provided between the first magnetic layer and the film portion, and a first nonmagnetic layer provided between the first magnetic layer and the first opposing magnetic layer. A second direction from the first opposing magnetic layer toward the first magnetic layer crosses the first direction. The power line is electrically insulated from the element portion. The power line includes a portion aligned with the first direction.

20 Claims, 9 Drawing Sheets

(56) References Cited

U.S. PATENT DOCUMENTS

| | | | | |
|---|---|---|---|---|
| 2011/0295128 A1* | 12/2011 | Yuasa | G01L 9/16 | 600/485 |
| 2012/0079887 A1* | 4/2012 | Giddings | G01B 7/24 | 73/779 |
| 2013/0148836 A1* | 6/2013 | Akino | H04R 1/04 | 381/355 |
| 2013/0170669 A1* | 7/2013 | Fukuzawa | H04R 1/08 | 381/115 |
| 2013/0289913 A1 | 10/2013 | Jahns et al. | | |
| 2014/0137658 A1* | 5/2014 | Higashi | H04R 7/10 | 73/779 |
| 2014/0137668 A1* | 5/2014 | Fukuzawa | A61B 5/021 | 73/862.69 |
| 2014/0369530 A1* | 12/2014 | Fuji | G01L 1/205 | 381/122 |
| 2015/0082888 A1* | 3/2015 | Otsu | G01N 29/28 | 73/587 |
| 2015/0082894 A1* | 3/2015 | Okamoto | A61B 5/021 | 73/723 |
| 2015/0082899 A1* | 3/2015 | Kaji | G01L 9/16 | 73/779 |
| 2015/0082900 A1* | 3/2015 | Fuji | G01L 9/007 | 73/779 |
| 2015/0082901 A1* | 3/2015 | Fuji | H04R 23/006 | 73/779 |
| 2015/0082917 A1* | 3/2015 | Fuji | H04R 31/00 | 73/862.69 |
| 2015/0088008 A1* | 3/2015 | Fuji | A61B 5/021 | 600/485 |
| 2015/0177284 A1* | 6/2015 | Fukuzawa | G01R 33/093 | 324/117 R |
| 2015/0266717 A1* | 9/2015 | Okamoto | B81B 3/0091 | 257/418 |
| 2015/0271586 A1* | 9/2015 | Fukuzawa | G01L 9/0051 | 381/122 |
| 2017/0094419 A1* | 3/2017 | Higashi | H04R 7/10 | |
| 2017/0241851 A1* | 8/2017 | Baba | B82Y 25/00 | |
| 2019/0086481 A1* | 3/2019 | Baba | G01R 33/093 | |
| 2020/0041363 A1* | 2/2020 | Baba | H04R 1/08 | |
| 2020/0069199 A1* | 3/2020 | Okamoto | B81B 3/0078 | |

* cited by examiner

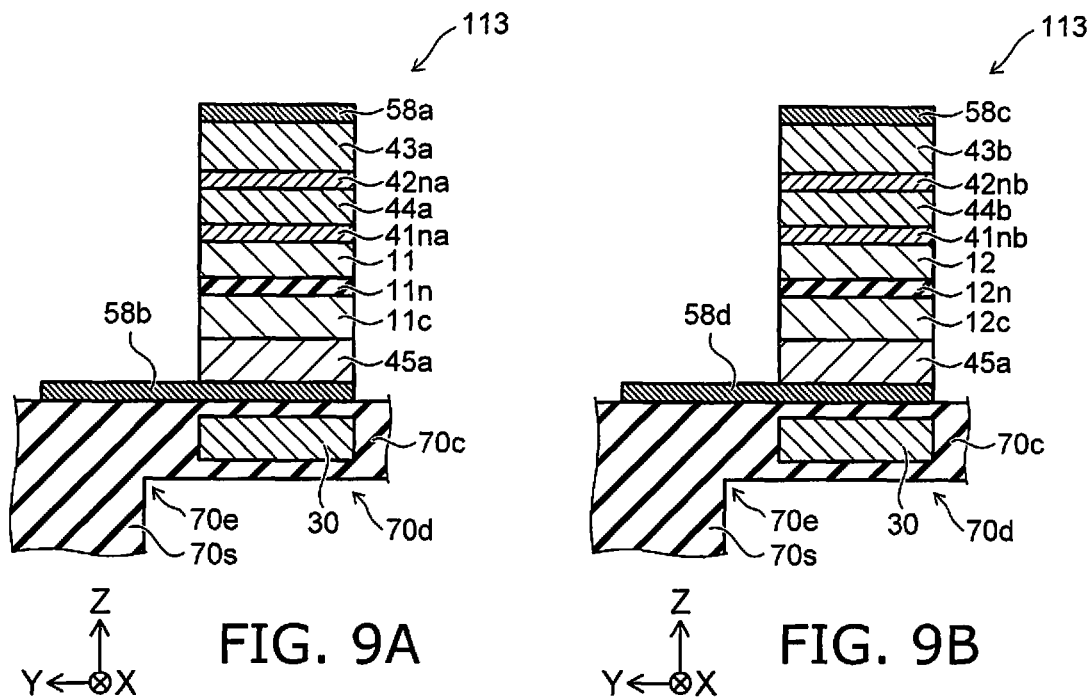
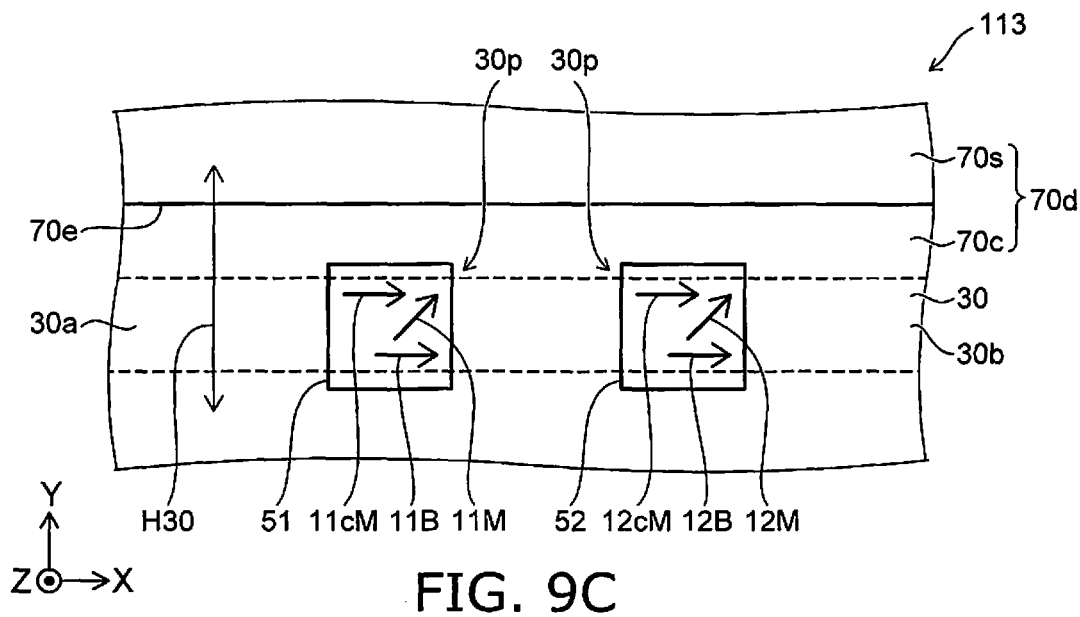

SENSOR

CROSS-REFERENCE TO RELATED APPLICATIONS

This application is based upon and claims the benefit of priority from Japanese Patent Application No. 2018-172793, filed on Sep. 14, 2018; the entire contents of which are incorporated herein by reference.

FIELD

Embodiments described herein relate generally to a sensor.

BACKGROUND

A sensor that uses a magnetic layer has been proposed. For example, the sensor is applied to a microphone, etc. It is desirable to reduce the noise of the sensor.

BRIEF DESCRIPTION OF THE DRAWINGS

FIG. 9A to FIG. 9C are schematic views illustrating a sensor according to the first embodiment;

DETAILED DESCRIPTION

Figure 1A:
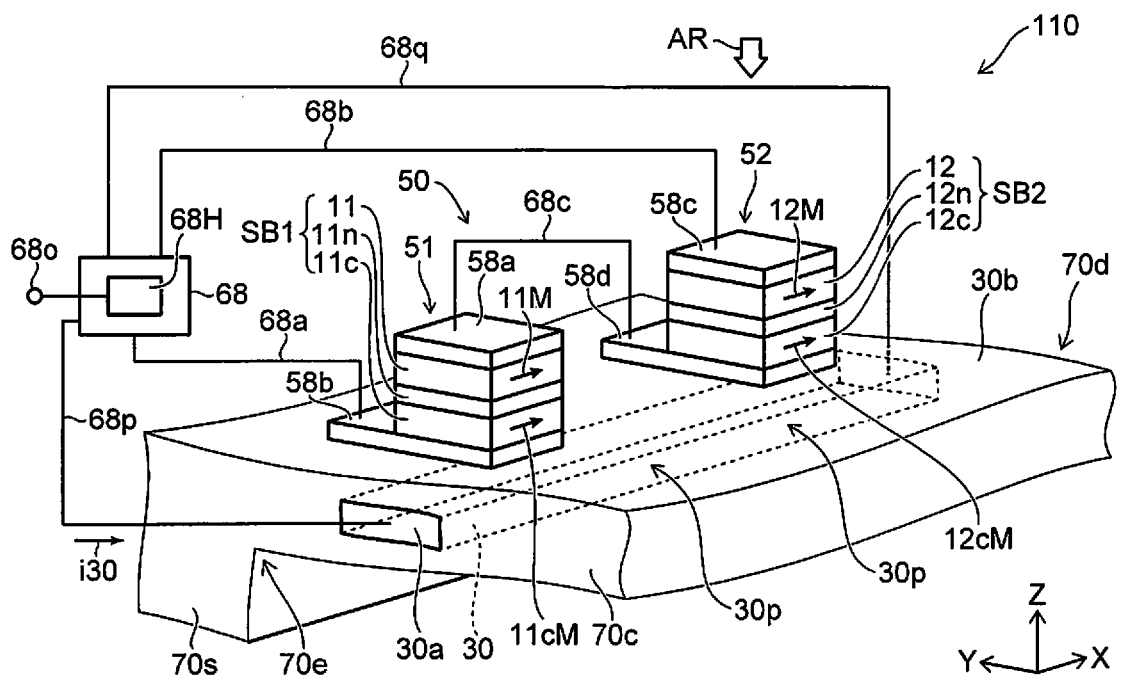
FIG. 1A and FIG. 1B are schematic views illustrating a sensor according to a first embodiment.

According to one embodiment, a sensor includes a structure body, an element portion, and a power line. The structure body includes a supporter and a film portion. The film portion is supported by the supporter and includes an end portion. The end portion is aligned with a first direction and supported by the supporter. The element portion includes a first element provided at the film portion. The first element includes a first magnetic layer, a first opposing magnetic layer provided between the first magnetic layer and the film portion, and a first nonmagnetic layer provided between the first magnetic layer and the first opposing magnetic layer. A second direction from the first opposing magnetic layer toward the first magnetic layer crosses the first direction. The power line is electrically insulated from the element portion. The power line includes a portion aligned with the first direction. A direction from the aligned portion of the power line toward the first element is aligned with the second direction.

According to another embodiment, a sensor includes a structure body, an element portion, a first power line and a second power line. The structure body includes a supporter and a film portion. The film portion is supported by the supporter and includes an end portion. The end portion is aligned with a first direction and supported by the supporter. The element portion includes a first element and a second element provided at the film portion. The first element includes a first magnetic layer, a first opposing magnetic layer provided between the first magnetic layer and the film portion, and a first nonmagnetic layer provided between the first magnetic layer and the first opposing magnetic layer. A second direction from the first opposing magnetic layer toward the first magnetic layer crosses the first direction. The second element includes a second magnetic layer, a second opposing magnetic layer provided between the second magnetic layer and the film portion, and a second nonmagnetic layer provided between the second magnetic layer and the second opposing magnetic layer. A direction from the second opposing magnetic layer toward the second magnetic layer is aligned with the second direction. A direction from the first element toward the second element is aligned with the first direction. The first power line and the second power line are electrically insulated from the element portion. A direction from a part of the first power line toward the first element is aligned with the second direction. A direction from a part of the second power line toward the second element is aligned with the second direction. The part of the first power line and the part of the second power line are aligned with the first direction.

Various embodiments are described below with reference to the accompanying drawings.

The drawings are schematic and conceptual; and the relationships between the thickness and width of portions, the proportions of sizes among portions, etc., are not necessarily the same as the actual values. The dimensions and proportions may be illustrated differently among drawings, even for identical portions.

In the specification and drawings, components similar to those described previously or illustrated in an antecedent drawing are marked with like reference numerals, and a detailed description is omitted as appropriate.

First Embodiment

Figure 1B:
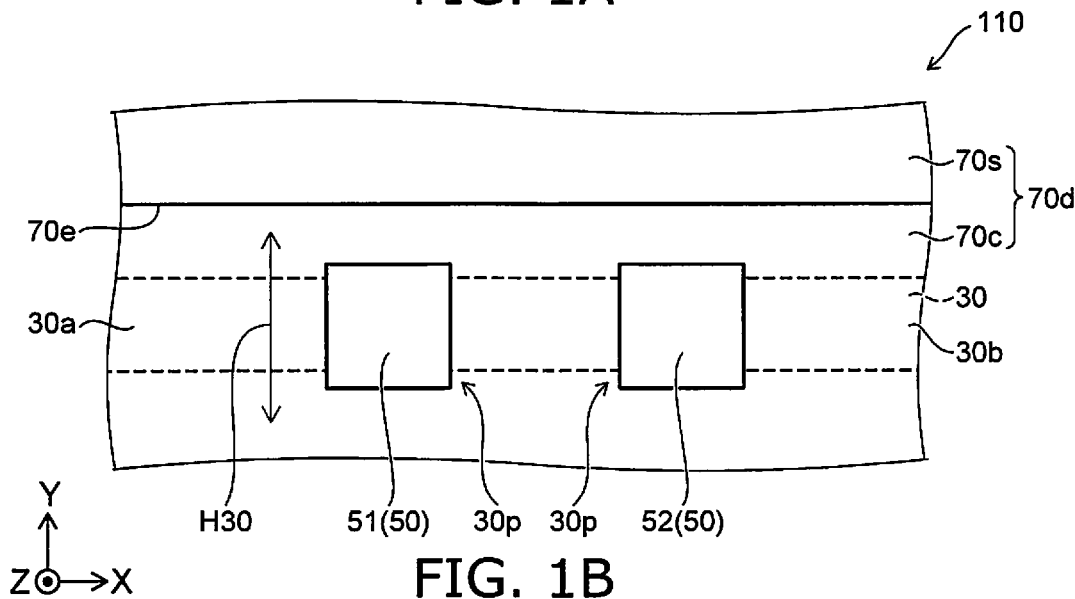

FIG. 1A and FIG. 1B are schematic views illustrating a sensor according to a first embodiment.

FIG. 1A is a perspective view. FIG. 1B is a plan view as viewed along arrow AR of FIG. 1A.

As shown in FIG. 1A, the sensor 110 according to the embodiment includes a structure body 70d and an element portion 50. A circuit portion 68 is further provided in the example. The circuit portion 68 may be included in the sensor 110. The circuit portion 68 may be provided separately from the sensor 110.

The structure body 70d includes a supporter 70s and a film portion 70c. The film portion 70c is supported by the supporter 70s. The film portion 70c includes an end portion 70e. The end portion 70e is supported by the supporter 70s. The end portion 70e is aligned with a first direction.

The first direction is taken as an X-axis direction. One direction perpendicular to the X-axis direction is taken as a Z-axis direction. A direction perpendicular to the X-axis direction and the Z-axis direction is taken as a Y-axis direction.

The film portion 70c is deformable. For example, the film portion 70c deforms when a force (e.g., sound or the like) is applied to the film portion 70c. The deformation includes, for example, a displacement along the Z-axis direction. The end portion 70e of the film portion 70c is a fixed end. The film portion 70c (the deforming portion) may be a cantilever beam or a fixed beam. For example, the thickness along the Z-axis direction of the film portion 70c is thinner than the thickness along the Z-axis direction of the supporter 70s. The film portion 70c is, for example, flexible.

The element portion 50 includes a first element 51. The first element 51 is provided at the film portion 70c. In the example, the element portion 50 further includes a second element 52. Thus, the element portion 50 may include multiple elements. The multiple elements (the first element 51, the second element 52, etc.) are magnetic elements.

The first element 51 and the second element 52 are provided at a portion of the film portion 70c. For example, the portion is a portion of the film portion 70c proximal to the supporter 70s. A relatively large strain is generated easily at the portion of the film portion 70c proximal to the supporter 70s when the film portion 70c deforms.

The first element 51 includes a first magnetic layer 11, a first opposing magnetic layer 11c, and a first nonmagnetic layer 11n. The first opposing magnetic layer 11c is provided between the first magnetic layer 11 and the film portion 70c. The first nonmagnetic layer 11n is provided between the first magnetic layer 11 and the first opposing magnetic layer 11c. The direction (a second direction) from the first opposing magnetic layer 11c toward the first magnetic layer 11 crosses the first direction (the X-axis direction). In the example, the second direction is the Z-axis direction.

The second element 52 includes a second magnetic layer 12, a second opposing magnetic layer 12c, and a second nonmagnetic layer 12n. The second opposing magnetic layer 12c is provided between the second magnetic layer 12 and the film portion 70c. The second nonmagnetic layer 12n is provided between the second magnetic layer 12 and the second opposing magnetic layer 12c. The direction from the second opposing magnetic layer 12c toward the second magnetic layer 12 is aligned with the second direction (in the example, the Z-axis direction).

The first magnetic layer 11, the first opposing magnetic layer 11c, the second magnetic layer 12, and the second opposing magnetic layer 12c are, for example, ferromagnetic layers.

The direction from the first element 51 toward the second element 52 is aligned with the first direction (the X-axis direction). For example, the absolute value of the angle between the first direction and the direction from the first element 51 toward the second element 52 is 20 degrees or less.

The first magnetic layer 11, the first opposing magnetic layer 11c, and the first nonmagnetic layer 11n are included in a first stacked body SB1. The second magnetic layer 12, the second opposing magnetic layer 12c, and the second nonmagnetic layer 12n are included in a second stacked body SB2. The first stacked body SB1 is included in the first element 51. The second stacked body SB2 is included in the second element 52.

First to fourth conductive layers 58a to 58d are provided in the example. The first stacked body SB1 is provided between the first conductive layer 58a and the second conductive layer 58b. The second stacked body SB2 is provided between the third conductive layer 58c and the fourth conductive layer 58d. A portion of the first conductive layer 58a and a portion of the second conductive layer 58b may be included in the first element 51. A portion of the third conductive layer 58c and a portion of the fourth conductive layer 58d may be included in the second element 52.

In the example, the second element 52 is electrically connected to the first element 51. The second element 52 is connected in series to the first element 51. For example, the S/N ratio can be improved. In the example, the first conductive layer 58a and the fourth conductive layer 58d are electrically connected by an interconnect 68c (which may be a conductive layer).

In the example, the second conductive layer 58b is electrically connected to the circuit portion 68 by an interconnect 68a (which may be a conductive layer). The third conductive layer 58c is electrically connected to the circuit portion 68 by an interconnect 68b (which may be a conductive layer).

The electrical resistances of the first element 51 and the second element 52 change according to the deformation of the film portion 70c. For example, strain (or stress) is generated in these elements by the deformation of the film portion 70c. Thereby, the angle between a magnetization 11M of the first magnetic layer 11 and a magnetization 11cM of the first opposing magnetic layer 11c changes. Also, the angle between a magnetization 12M of the second magnetic layer 12 and a magnetization 12cM of the second opposing magnetic layer 12c changes. For example, it is considered that the changes of the angles are based on an inverse magnetostrictive effect. The electrical resistance changes due to the change of the angle between the two magnetizations. For example, it is considered that the change of the electrical resistance is based on a magnetoresistance effect.

For example, the orientation of the magnetization 11cM of the first opposing magnetic layer 11c and the orientation of the magnetization 12cM of the second opposing magnetic layer 12c are substantially fixed. For example, the first opposing magnetic layer 11c and the second opposing magnetic layer 12c are reference layers. For example, the orientation of the magnetization 11M of the first magnetic layer 11 and the orientation of the magnetization 12M of the second magnetic layer 12 change easily. The first magnetic layer 11 and the second magnetic layer 12 are, for example, free magnetic layers. In the embodiment, the first opposing magnetic layer 11c and the second opposing magnetic layer 12c may be free magnetic layers; and the first magnetic layer 11 and the second magnetic layer 12 may be reference layers. Hereinbelow, the first opposing magnetic layer 11c and the second opposing magnetic layer 12c are taken to be reference layers; and the first magnetic layer 11 and the second magnetic layer 12 are taken to be free magnetic layers.

A power line 30 is electrically insulated from the element portion 50. The power line 30 includes a portion 30p aligned with the first direction (the X-axis direction). The direction from the aligned portion 30p of the power line 30 toward the first element 51 is aligned with the second direction (e.g., the Z-axis direction). The direction from the aligned portion 30p of the power line 30 toward the second element 52 also is aligned with the second direction (e.g., the Z-axis direction).

At least a portion of the portion 30p overlaps the first element 51 and the second element 52 in the Z-axis direction.

In the example, the power line 30 is provided at the film portion 70c. The element portion 50 that includes the first element 51 and the second element 52 is provided on the power line 30. For example, at least a portion of the film portion 70c is provided between the power line 30 and the first element 51. At least a portion of the film portion 70c is provided between the power line 30 and the second element 52. As described below, the power line 30 may be provided on the first element 51.

The circuit portion 68 is electrically connected to the power line 30. For example, an end portion 30a of the power line 30 is electrically connected to the circuit portion 68 by an interconnect 68p. Another end portion 30b of the power line 30 is electrically connected to the circuit portion 68 by an interconnect 68q (referring to FIG. 1A).

The circuit portion 68 supplies a current i30 to the power line 30. The current i30 has an alternating current component. The alternating current component has a first frequency.

As shown in FIG. 1B, a magnetic field H30 (a current-produced magnetic field) is generated from the power line 30 by the current i30. The magnetic field H30 is applied to the first element 51 and the second element 52. As described above, the portion 30p of the power line 30 recited above (the portion that overlaps the element) is aligned with the first direction (the X-axis direction). Therefore, the magnetic field H30 has a Y-axis direction component at the positions of these elements.

The signal that is obtained from these elements in the state in which the magnetic field H30 is applied is processed by the circuit portion 68. The circuit portion 68 may include, for example, a filter circuit 68H (referring to FIG. 1A). For example, the output of the filter circuit 68H may be the output of the circuit portion 68. The signal after the processing is output from an outputter 68O of the circuit portion 68.

An example of the operation of the circuit portion 68 will now be described.

Figure 2:
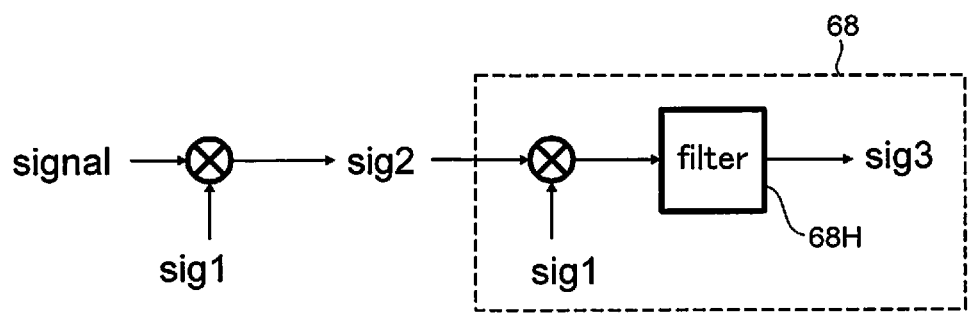
FIG. 2 is a block diagram showing the sensor according to the embodiment.

FIG. 2 is a block diagram showing the sensor according to the embodiment.

As shown in FIG. 2, for example, a signal "signal" that corresponds to the force to be detected is generated in the first element 51. On the other hand, a second signal Sig2 is generated by the signal "signal" being acted upon by a first signal Sig1 included in the current i30 supplied from the circuit portion 68 to the power line 30. The second signal Sig2 corresponds to the signal obtained in the first element 51 when the current i30 is supplied.

The second signal Sig2 is processed in the circuit portion 68. For example, the second signal Sig2 that is acted upon by the signal corresponding to the first signal Sig1 is input to the filter circuit 68H of the circuit portion 68. A third signal Sig3 is output from the filter circuit 68H.

For example, the circuit portion 68 has an AM modulation function. For example, the circuit portion 68 has a demodulation function. The circuit portion 68 performs the demodulation by multiplying the second signal Sig2 by the first signal Sig1. For example, the third signal Sig3 is obtained via the filter circuit 68H (e.g., a low-pass filter). An electrical signal in which the "1/f noise" is suppressed (an electrical signal corresponding to the force to be detected) is obtained.

Figure 3A:
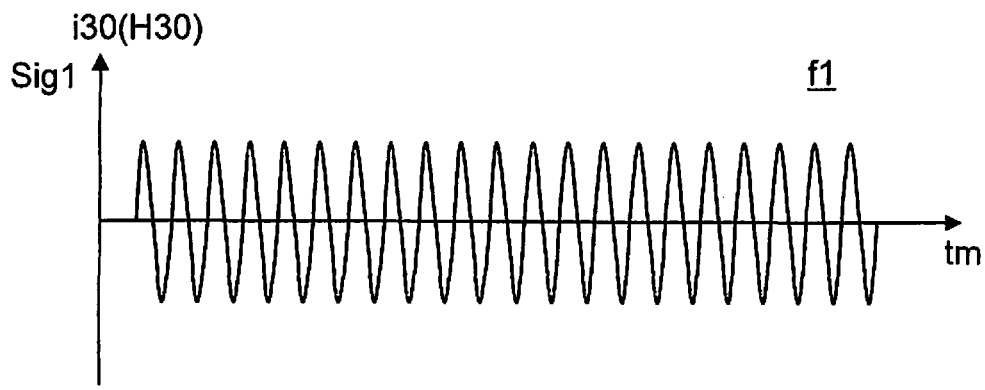
FIG. 3A to FIG. 3C are schematic views illustrating the operation of the sensor according to the embodiment.
Figure 3B:
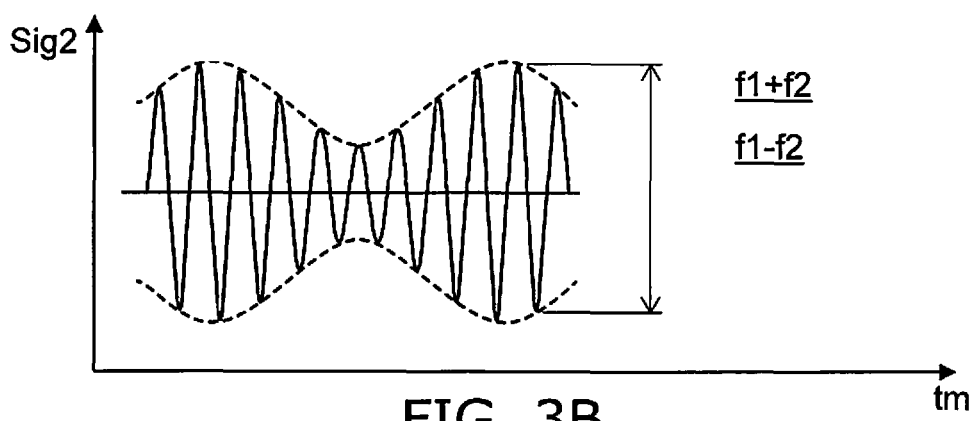
Figure 3C:
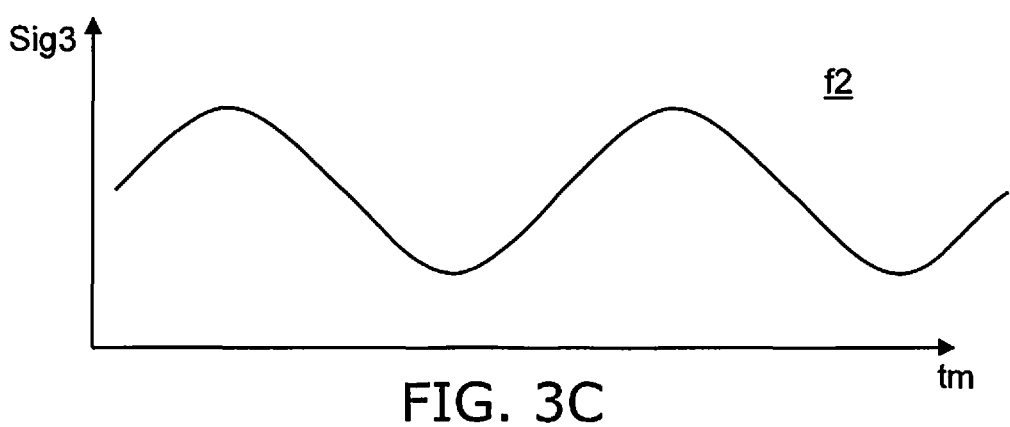

FIG. 3A to FIG. 3C are schematic views illustrating the operation of the sensor according to the embodiment.

FIG. 3A corresponds to the first signal Sig1 included in the current i30 supplied from the circuit portion 68 to the power line 30. The change of the first signal Sig1 corresponds to the change of the magnetic field H30. FIG. 3B illustrates the second signal Sig2 obtained from the element portion 50 (e.g., the first element 51, the second element 52, etc.). The second signal Sig2 is acquired from the element portion 50 by the circuit portion 68. FIG. 3C illustrates the third signal Sig3 output from the circuit portion 68. In these figures, the horizontal axis is a time tm. In these figures, the vertical axis corresponds to the intensity of the signal.

As shown in FIG. 3A, the current i30 (the first signal Sig1) and the magnetic field H30 oscillate at the first frequency f1. The first signal Sig1 may be an analog signal oscillating at the first frequency f1, or may be a digital signal including information having the first frequency f1. The magnetic field H30 that has an alternating current component having the first frequency f1 is applied to the element portion 50.

On the other hand, the force to be detected is applied to the film portion 70c from the outside. For example, the film portion 70c oscillates at a second frequency f2. The second frequency f2 is lower than the first frequency f1. The signal that is obtained from the element portion 50 at this time is the second signal Sig2. The second signal Sig2 has a component of the signal corresponding to the change of electrical resistances of elements.

As shown in FIG. 3B, for example, the temporal change of the second signal Sig2 is illustrated by the product of the cosine wave of the first frequency ft and the cosine wave of the second frequency f2. For example, the second signal Sig2 has a component oscillating at the frequency of the difference between the first frequency f1 and the second frequency f2 (f1−f2) and a component oscillating at the frequency of the sum of the first frequency f1 and the second frequency f2 (f1+f2). Such a second signal Sig2 is obtained from the element portion 50.

The circuit portion 68 is configured to output the third signal Sig3 based on the first signal Sig1 relating to the first frequency f1 and the second signal Sig2 obtained from the element portion 50 (referring to FIG. 3C). For example, the circuit portion 68 calculates a signal in which the second signal Sig2 is further multiplied by a cosine wave oscillating at the first frequency ft. This signal has a component oscillating at the second frequency f2. From this signal, the third signal Sig3 that oscillates at the second frequency f2 is output by the filter circuit 68H (e.g., the low-pass filter), etc. The signal that corresponds to the external force to be detected (the signal changing at the second frequency f2) can be detected by detecting the third signal Sig3.

For example, there are cases where "1/f noise" occurs when detecting an external force such as sound, etc. The noise can be reduced by reducing the "1/f noise." In the embodiment, the 1/f noise can be reduced by using the high frequency current i30 (the first signal Sig1). According to the embodiment, a sensor can be provided in which the noise can be reduced.

The first frequency f1 recited above is higher than the frequency (the second frequency f2) of the deformation of the film portion 70c. The first frequency f1 is, for example, not less than 20 kilohertz (kHz) and not more than 400 kHz. The second frequency f2 is, for example, not less than 20 hertz (Hz) and not more than 200 kHz. The second frequency f2 may be, for example, less than 20 kHz. In the embodiment, the effects of the "1/f noise" can be suppressed by applying, to the element portion 50, the magnetic field H30 modulated at the high frequency.

The second signal Sig2 recited above is a signal modulated by the deformation of the film portion 70c. For example, the circuit portion 68 demodulates the second signal Sig2 and outputs the third signal Sig3.

In the case where the multiple elements (the first element 51, the second element 52, etc.) are provided in the element portion 50, the second signal Sig2 is obtained from the multiple elements (the first element 51, the second element 52, etc.).

Figure 4:
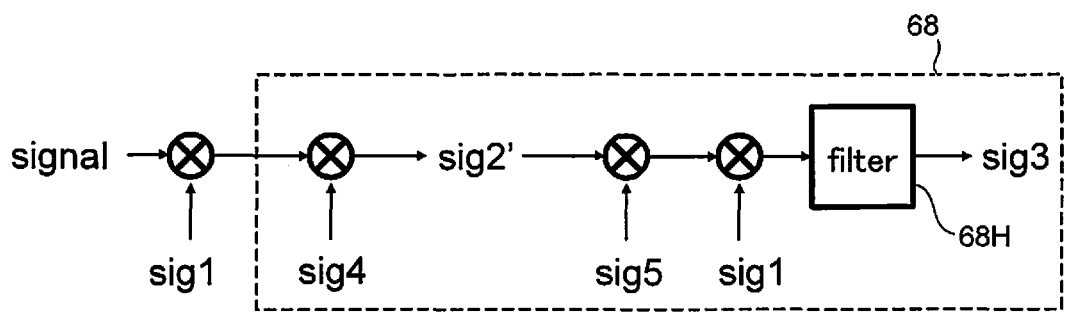
FIG. 4 is a block diagram showing the sensor according to the embodiment.

FIG. 4 is a block diagram showing the sensor according to the embodiment.

As shown in FIG. 4, for example, a signal Sig2' is generated by the first signal Sig1 and a fourth signal Sig4 acting on the signal "signal" corresponding to the force to be detected. The fourth signal Sig4 corresponds to a spread signal described below.

The signal Sig2' is obtained. The signal Sig2' that is acted upon by a fifth signal Sig5 and the first signal Sig1 is input to, for example, the filter circuit 68H of the circuit portion 68. The fifth signal Sig5 corresponds to a despread signal described below. The third signal Sig3 is output from the filter circuit 68H.

FIG. 5A to FIG. 5D are schematic views illustrating the operation of the sensor according to the embodiment.

Figure 5A:
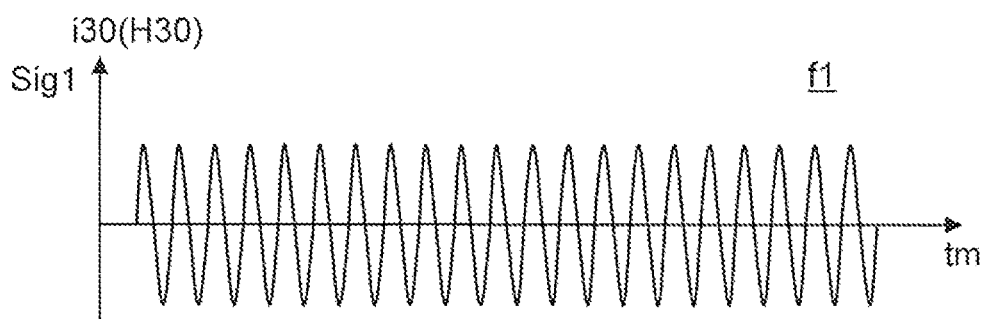
FIG. 5A to FIG. 5D are schematic views illustrating the operation of the sensor according to the embodiment.
Figure 5B:
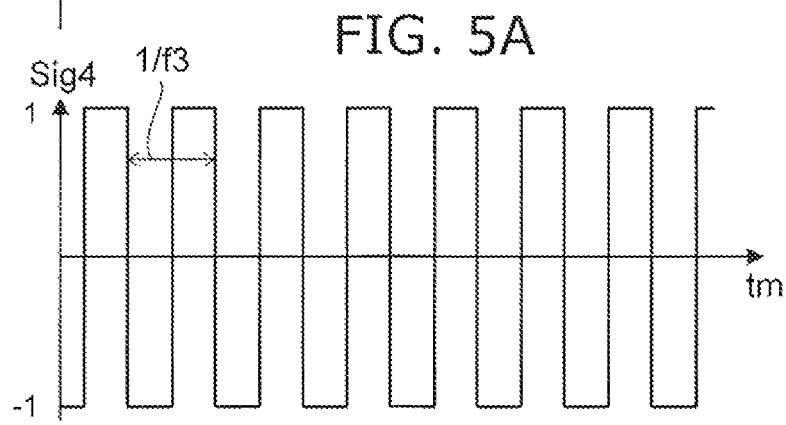
Figure 5C:
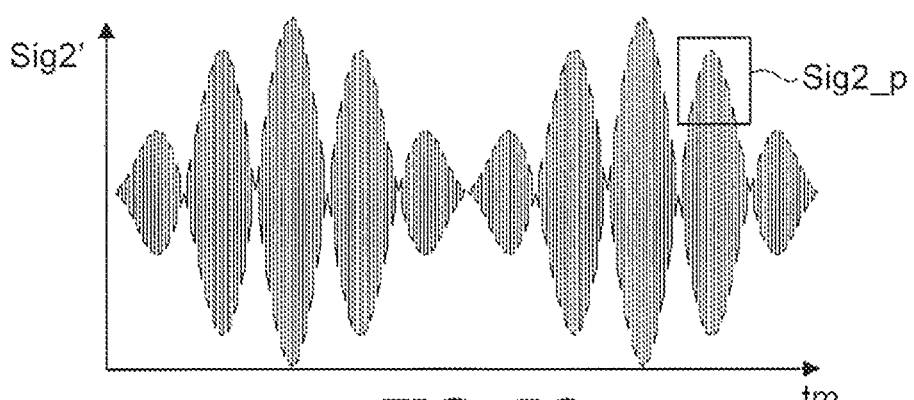
Figure 5D:
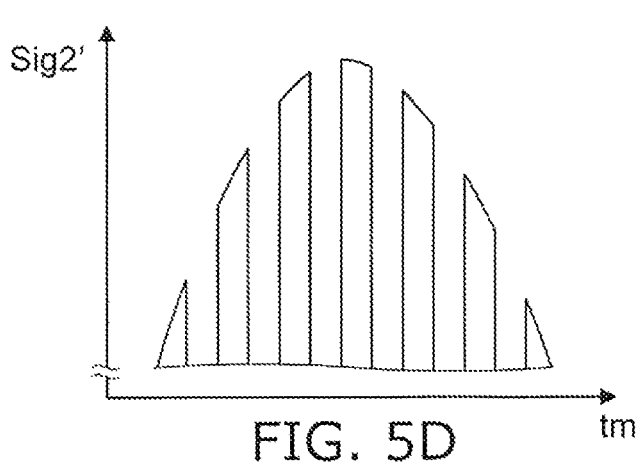

FIG. 5A corresponds to the first signal Sig1. As described above, the first signal Sig1 is included in the current i30 supplied from the circuit portion 68 to the power line 30. The change of the first signal Sig1 corresponds to the change of the magnetic field H30. FIG. 5B corresponds to the fourth signal Sig4. FIG. 5C corresponds to the signal Sig2' recited above. FIG. 5D illustrates an enlargement of a portion Sig2_p of the signal Sig2' illustrated in FIG. 5C. In these figures, the horizontal axis is the time tm. In these figures, the vertical axis corresponds to the intensity of the signal.

As shown in FIG. 5A, the current i30 (the first signal Sig1) and the magnetic field H30 oscillate at the first frequency f1.

As shown in FIG. 5B, the fourth signal Sig4 is a square wave. The value of the fourth signal Sig4 is, for example, +1 or -1. The occurrence of the positive/negative values of the pulse is designed to be substantially random. The time that corresponds to the positive/negative values of the pulse is shorter than the time of the reciprocal of the first frequency f1. A third frequency f3 is higher than the first frequency f1, wherein the third frequency f3 is the reciprocal of the time corresponding to the positive/negative values of the pulse. The fourth signal Sig4 corresponds to the spread signal.

The signal "signal" that corresponds to the force to be detected, the first signal Sig1 recited above, the signal that is obtained from the first element 51, and the signal Sig2' illustrated in FIG. 5C from the fourth signal Sig4 are obtained.

The power of the signal Sig2' is spread into a wide bandwidth by the spread signal (the fourth signal Sig4). Thereby, for example, effects on the other circuits are suppressed. For example, effects on the signal Sig2' from the other circuits are suppressed. For example, a low coherence is obtained. For example, the interference immunity improves.

The signal Sig2' is demodulated by the despread signal (the fifth signal Sig5 of FIG. 4) (referring to FIG. 4). Demodulation is performed by multiplying the demodulated signal by the electrical signal of the first signal Sig1. For example, the signal that is obtained is supplied to the filter circuit 68H (e.g., the low-pass filter), etc. The third signal Sig3 is output from the filter circuit 68H. Thereby, for example, an electrical signal (an electrical signal corresponding to the force to be detected) is obtained in which the "1/f noise" is suppressed.

Several examples of sensors according to the embodiment will now be described. Hereinbelow, the first element 51 is described for simplification. The second element 52 may have a configuration similar to that of the first element 51.

Figure 6:
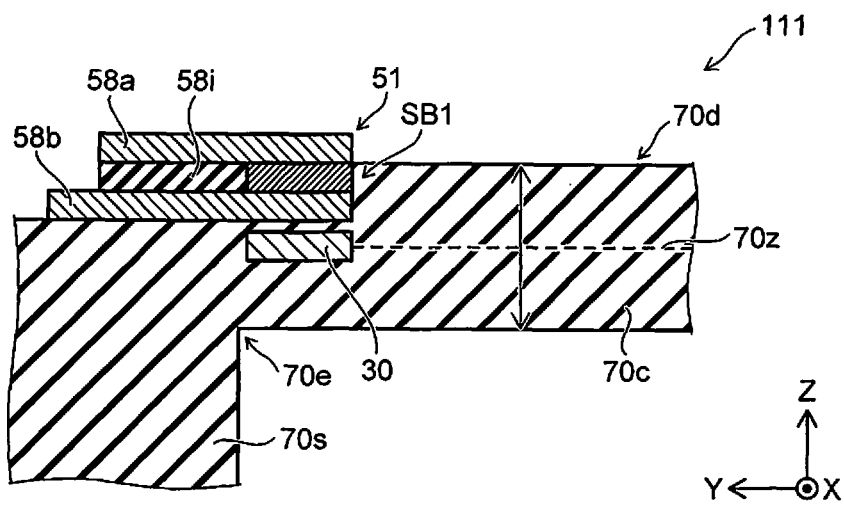
FIG. 6 is a schematic cross-sectional view illustrating a sensor according to the first embodiment.

FIG. 6 is a schematic cross-sectional view illustrating a sensor according to the first embodiment.

In the sensor 111 as shown in FIG. 6, at least a portion of the first element 51 is buried in the film portion 70c. For example, the first stacked body SB1 overlaps the film portion 70c in the Y-axis direction. At least a portion of the film portion 70c is provided between the power line 30 and the first element 51 (the first stacked body SB1).

In the example, the power line 30 is provided at substantially the central portion of the film portion 70c in the thickness direction. For example, a line (a plane) that passes through a center position 70z in the Z-axis direction of the film portion 70c along the X-Y plane passes through the power line 30. At the center position 70z in the Z-axis direction of the film portion 70c, strain is not generated easily even when the film portion 70c deforms. By providing the power line 30 at such a portion, damage of the power line 30 due to the deformation of the film portion 70c is suppressed.

In the example, an insulating portion 58i is provided between the first conductive layer 58a and the second conductive layer 58b.

Figure 7:
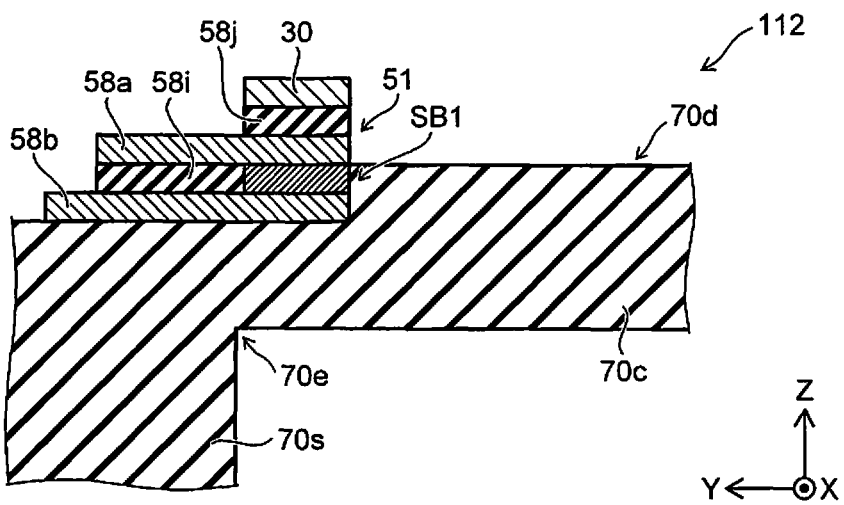
FIG. 7 is a schematic cross-sectional view illustrating a sensor according to the first embodiment.

FIG. 7 is a schematic cross-sectional view illustrating a sensor according to the first embodiment.

In the sensor 112 as shown in FIG. 7, the power line 30 is provided on the first element 51. For example, the first element 51 is provided between the film portion 70c and the power line 30. An insulating layer 58j is provided between the power line 30 and the first conductive layer 58a of the first element 51.

Figure 8:
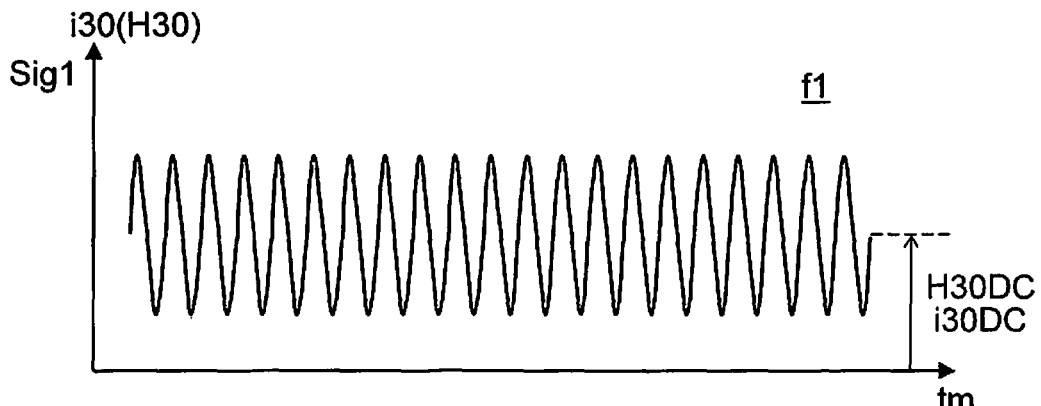
FIG. 8 is a schematic view illustrating the operation of the sensor according to the embodiment.

FIG. 8 is a schematic view illustrating the operation of the sensor according to the embodiment.

FIG. 8 illustrates the current i30 (the first signal Sig1). In the example as shown in FIG. 8, the current i30 (the first signal Sig1) also has a direct current component i30DC in addition to the alternating current component having the first frequency f1. Thereby, the magnetic field H30 that is generated by the current i30 has a direct current component H30DC. The direct current component H30DC is aligned with the Y-axis direction (referring to FIG. 1B).

Such a direct current component H30DC is applied to the element portion 50. A magnetic field (a bias magnetic field) that has a Y-axis direction component is applied to the first element 51 and the second element 52 of the element portion 50. By adjusting the current i30, the magnetizations of the free magnetic layers (e.g., the first magnetic layer 11 and the second magnetic layer 12) can be tilted with respect to the Y-axis direction and the X-axis direction.

In one example, the magnetizations of the reference layers (the first opposing magnetic layer 11c and the second opposing magnetic layer 12c) are aligned with the X-axis direction (or the Y-axis direction). The magnetizations of the free magnetic layers (the first magnetic layer 11 and the second magnetic layer 12) are tilted with respect to the X-axis direction by the bias magnetic field (the direct current component H30DC of the magnetic field H30). For example, in the state (the "initial state") in which an external force (sound or the like) is not applied to the film portion 70c, the angle between the magnetization of the reference layer and the magnetization of the free magnetic layer is set to, for example, not less than 30 degrees and not more than 60 degrees (e.g., about 45 degrees). This angle may be, for example, not less than 120 degrees and not more than 150 degrees (e.g., about 135 degrees). Due to such an angle (a tilted angle), the orientation of the magnetization of the free magnetic layer can change easily even when the external force is small. For example, high sensitivity is obtained.

The film portion 70c includes the end portion 70e aligned with the first direction (the X-axis direction). The strain (or the stress) that is generated when the film portion 70c deforms is aligned with the Y-axis direction. Because the magnetization of the free magnetic layer is tilted with respect to the direction (the first direction) of the end portion 70e in the "initial state," the sensitivity to the change of the electrical resistance with respect to the deformation of the film portion 70c can be increased.

As described below, such a member that forms a magnetic bias may be provided in the interior of the element.

FIG. 9A to FIG. 9C are schematic views illustrating a sensor according to the first embodiment.

FIG. 9A is a cross-sectional view of a portion including the first element 51. FIG. 9B is a cross-sectional view of a portion including the second element 52. FIG. 9C is a plan view. In the example, the power line 30 is provided inside the film portion 70c. As described in reference to FIG. 7, the power line 30 may be provided on the element (the first element 51, etc.).

In the sensor 113 as shown in FIG. 9A, the first element 51 includes a third magnetic layer 43a. The first magnetic layer 11 is provided between the third magnetic layer 43a and the first opposing magnetic layer 11c. The third magnetic layer 43a includes at least one of a first material or a second material. The first material includes at least one selected from the group consisting of Ir—Mn, Pt—Mn, Pd—Pt—Mn, and Ru—Rh—Mn. The second material includes at least one of CoPt (the ratio of Co being not less than 50 at. % and not more than 85 at. %), $(Co_{x1}Pt_{100-x1})_{100-y1}Cr_{y1}$ (x1 being not less than 50 at. % and not more than 85 at. %, and y1 being not less than 0 at. % and not more than 40 at. %), or FePt (the ratio of Pt being not less than 40 at. % and not more than 60 at. %).

The third magnetic layer 43a is, for example, an antiferromagnetic layer. A magnetic bias 11B from the third magnetic layer 43a (referring to FIG. 9C) acts on the magnetization 11M of the first magnetic layer 11.

As shown in FIG. 9C, the magnetic bias 11B is aligned with the X-axis direction. In such a case, the magnetic field H30 is generated by supplying the current i30 to the power line 30. The magnetic field H30 has a Y-axis direction component.

For example, the magnetic bias 11B that is aligned with the X-axis direction and the magnetic field H30 that has the Y-axis direction component act on the first magnetic layer 11. The magnetization 11M of the first magnetic layer 11 is tilted with respect to the Y-axis direction (and the X-axis direction) by the action of the combination of the magnetic bias 11B and the magnetic field H30.

In the example as shown in FIG. 9A, the first element 51 further includes a fifth magnetic layer 45a. The first opposing magnetic layer 11c is provided between the fifth magnetic layer 45a and the third magnetic layer 43a. The first magnetic layer 11 is provided between the first opposing magnetic layer 11c and the third magnetic layer 43a. A fourth magnetic layer 44a is provided between the first magnetic layer 11 and the third magnetic layer 43a.

The fifth magnetic layer 45a includes at least one of a third material or a fourth material. The third material includes at least one selected from the group consisting of Ir—Mn, Pt—Mn, Pd—Pt—Mn, and Ru—Rh—Mn. The fourth material includes at least one of CoPt (the ratio of Co being not less than 50 at. % and not more than 85 at. %), $(Co_{x2}Pt_{100-x2})_{100-y2}Cr_{y2}$ (x2 being not less than 50 at. % and not more than 85 at. %, and y2 being not less than 0 at. % and not more than 40 at. %), or FePt (the ratio of Pt being not less than 40 at. % and not more than 60 at. %).

The fifth magnetic layer 45a is, for example, an antiferromagnetic layer. The orientation of the magnetization 11cM of the first opposing magnetic layer 11c can be set to the desired state by the magnetic bias from the fifth magnetic layer 45a. In the example as shown in FIG. 9C, for example, the orientation of the magnetization 11cM is aligned with the first direction (the X-axis direction).

By such a configuration, in the "initial state," the magnetization 11M of the first magnetic layer 11 is tilted with respect to the direction (the first direction) of the end portion 70e and tilted with respect to the magnetization 11cM of the first opposing magnetic layer 11c. For example, the sensitivity to the change of the electrical resistance with respect to the deformation of the film portion 70c can be increased.

In the example as shown in FIG. 9A, the first element 51 further includes the fourth magnetic layer 44a. The fourth magnetic layer 44a is provided between the third magnetic layer 43a and the first magnetic layer 11. For example, the magnetic state of the fourth magnetic layer 44a is controlled by the third magnetic layer 43a (e.g., the antiferromagnetic layer). The orientation of the magnetization 11M of the first magnetic layer 11 can be set to the desired state by the magnetic action from the fourth magnetic layer 44a.

In the example, a nonmagnetic intermediate layer 41na is provided between the first magnetic layer 11 and the fourth magnetic layer 44a. A nonmagnetic intermediate layer 42na is provided between the fourth magnetic layer 44a and the third magnetic layer 43a. These nonmagnetic intermediate layers include, for example, at least one selected from the group consisting of Cu, Ru, Au, Ag, Cr, Ir, and Mg. The intensity of the magnetic action can be controlled by these nonmagnetic intermediate layers. These nonmagnetic intermediate layers are provided as necessary and may be omitted.

As shown in FIG. 9B, the second element 52 may include another third magnetic layer 43b. The other third magnetic layer 43b is an antiferromagnetic layer. A magnetic bias 12B from the other third magnetic layer 43b (referring to FIG. 9C) acts on the magnetization 12M of the second magnetic layer 12. For example, the magnetic bias 12B is aligned with the X-axis direction. The magnetization 12M of the second magnetic layer 12 is tilted with respect to the Y-axis direction (and the X-axis direction) by the action of the combination of the magnetic bias 12B and the magnetic field H30 along the Y-axis direction due to the current i30.

In the example as shown in FIG. 9B, the second element 52 further includes another fifth magnetic layer 45b. The other fifth magnetic layer 45b is, for example, an antiferromagnetic layer. The orientation of the magnetization 12cM of the second opposing magnetic layer 12c can be set to the desired state by the magnetic bias from the other fifth magnetic layer 45b. As shown in FIG. 9C, for example, the orientation of the magnetization 12cM is aligned with the first direction (the X-axis direction).

In the example as shown in FIG. 9B, the second element 52 further includes another fourth magnetic layer 44b. For example, the magnetic state of the other fourth magnetic layer 44b can be controlled by the other third magnetic layer 43b (e.g., the antiferromagnetic layer); and the orientation of the magnetization 12M of the second magnetic layer 12 can be set to the desired state by the magnetic action from the other fourth magnetic layer 44b.

In the example, a nonmagnetic intermediate layer 41nb is provided between the second magnetic layer 12 and the other fourth magnetic layer 44b. A nonmagnetic intermediate layer 42nb is provided between the other fourth magnetic layer 44b and the other third magnetic layer 43b. The intensity of the magnetic action can be controlled by these nonmagnetic intermediate layers. These nonmagnetic intermediate layers are provided as necessary and may be omitted.

The other third magnetic layer 43b includes, for example, the materials described in reference to the third magnetic layer 43a. The other fourth magnetic layer 44b includes, for example, the materials described in reference to the fourth magnetic layer 44a. The other fifth magnetic layer 45b includes, for example, the materials described in reference to the fifth magnetic layer 45a. The nonmagnetic intermediate layers 41nb and 42nb include, for example, the materials described in reference to the nonmagnetic intermediate layers 41na and 42na.

In the embodiment recited above, at least one of the first magnetic layer 11 or the second magnetic layer 12 includes Fe and B. At least one of the first opposing magnetic layer 11c or the second opposing magnetic layer 12c includes at least one selected from the group consisting of Fe, Co, and Ni. At least one of the fourth magnetic layer 44a or the other fourth magnetic layer 44b includes at least one selected from the group consisting of Fe, Co, and Ni.

At least one of the first nonmagnetic layer 11n or the second nonmagnetic layer 12n includes, for example, oxygen and at least one selected from the group consisting of Mg, Al, Ti, Zn, and Ga.

At least one of the first conductive layers 58a to 58d includes, for example, at least one selected from the group consisting of aluminum, copper, silver, tantalum, and gold. At least one of the first conductive layers 58a to 58d may include, for example, at least one selected from the group consisting of TaMo, Ti, and TiN.

Second Embodiment

In a second embodiment, another power line is provided at one of the multiple elements included in the element portion 50; and another power line is provided at another one of the multiple elements. In the description relating to the second embodiment hereinbelow, portions similar to those of the first embodiment are omitted as appropriate.

Figure 10:
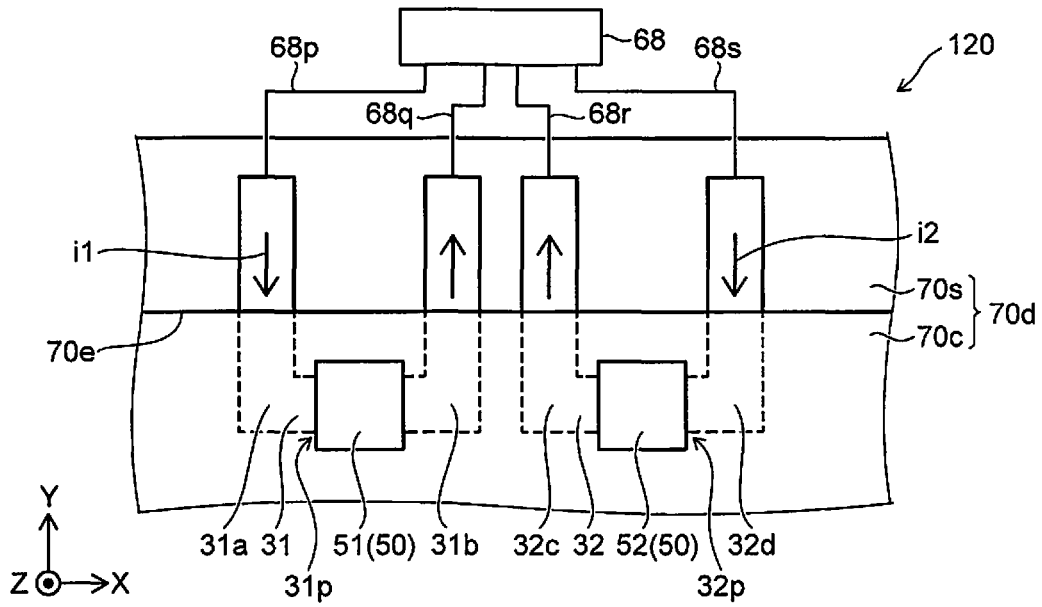
FIG. 10 is a schematic plan view illustrating a sensor according to a second embodiment.

FIG. 10 is a schematic plan view illustrating the sensor according to the second embodiment.

As shown in FIG. 10, the sensor 120 includes the structure body 70d, the element portion 50, a first power line 31, and a second power line 32. In such a case as well, the circuit portion 68 is further provided. The circuit portion 68 may be included in the sensor 120 or may be provided separately from the sensor 120.

In the example as well, the structure body 70d includes the supporter 70s and the film portion 70c. The film portion 70c is supported by the supporter 70s. The film portion 70c includes the end portion 70e. The end portion 70e is supported by the supporter 70s and is aligned with the first direction (e.g., the X-axis direction). The film portion 70c is deformable.

The element portion 50 includes the first element 51 and the second element 52. The first element 51 and the second element 52 are provided at the film portion 70c (the deforming portion). For example, the configurations of the first element 51 and the second element 52 are the configurations described in reference to the first embodiment.

For example, the first element 51 includes the first magnetic layer 11, the first opposing magnetic layer 11c provided between the first magnetic layer 11 and the film portion 70c, and the first nonmagnetic layer 11n provided between the first magnetic layer 11 and the first opposing magnetic layer 11c (referring to FIG. 1A). The direction (the second direction) from the first opposing magnetic layer 11c toward the first magnetic layer 11 crosses the first direction (the X-axis direction). The second direction is, for example, the Z-axis direction.

For example, the second element 52 includes the second magnetic layer 12, the second opposing magnetic layer 12c provided between the second magnetic layer 12 and the film portion 70c, and the second nonmagnetic layer 12n provided between the second magnetic layer 12 and the second opposing magnetic layer 12c (referring to FIG. 1A). The direction from the second opposing magnetic layer 12c toward the second magnetic layer 12 is aligned with the second direction (the Z-axis direction). The direction from the first element 51 toward the second element 52 is aligned with the first direction (the X-axis direction).

The first element 51 and the second element 52 are electrically connected to the circuit portion 68 (referring to FIG. 1A). The interconnects that connect between the circuit portion 68 and these elements (referring to FIG. 1A), etc., are not illustrated in FIG. 10.

The first power line 31 and the second power line 32 are electrically insulated from the element portion 50.

The direction from a part 31p of the first power line 31 toward the first element 51 is aligned with the second direction (the Z-axis direction). The direction from a part 32p of the second power line 32 toward the second element 52 is aligned with the second direction (the Z-axis direction). The part 31p of the first power line 31 recited above and the part 32p of the second power line 32 recited above are aligned with the first direction (the X-axis direction).

For example, the first power line 31 includes a first portion 31a and a second portion 31b. The direction from the first portion 31a toward the second portion 31b is aligned with the first direction (the X-axis direction). The second power line 32 includes a third portion 32c and a fourth portion 32d. The direction from the third portion 32c toward the fourth portion 32d is aligned with the first direction (the X-axis direction).

The second portion 31b is provided between the first portion 31a and the fourth portion 32d. The third portion 32c is provided between the second portion 31b and the fourth portion 32d.

The part 31p of the first power line 31 recited above is between the first portion 31a and the second portion 31b. The part 32p of the second power line 32 recited above is between the third portion 32c and the fourth portion 32d.

The circuit portion 68 is electrically connected to the first power line 31 and the second power line 32. For example, the circuit portion 68 is electrically connected to the first portion 31a by the interconnect 68p. For example, the circuit portion 68 is electrically connected to the second portion 31b by the interconnect 68q. For example, the circuit portion 68 is electrically connected to the third portion 32c by an interconnect 68r. For example, the circuit portion 68 is electrically connected to the fourth portion 32d by an interconnect 68s.

The circuit portion 68 supplies, to the first power line 31, a first current i1 having an alternating current component.

The circuit portion 68 supplies, to the second power line 32, a second current i2 having an alternating current component.

For example, a magnetic field that has an alternating current component (a high frequency component) is applied to the first element 51 by the first power line 31. For example, a magnetic field that has an alternating current component (a high frequency component) is applied to the second element 52 by the second power line 32. The "1/f noise" can be suppressed in these elements. In the sensor 120 as well, a sensor is provided in which the noise can be reduced.

In the sensor 120, a power line is provided independently for each of the multiple elements. The currents that flow in the power lines can be controlled independently. The desired characteristics can be obtained easily for each of the multiple elements.

In the sensor 120, for example, the second current i2 may flow from the fourth portion 32d toward the third portion 32c in at least a portion of a time when the first current i1 flows from the first portion 31a toward the second portion 31b. The second current i2 may flow from the third portion 32c toward the fourth portion 32d in at least a portion of a time when the first current i1 flows from the second portion 31b toward the first portion 31a.

By such orientations of the currents (phases of the alternating currents), the orientation of the magnetic field generated in the current path between the second portion 31b and the circuit portion 68 is the reverse of the orientation of the magnetic field generated in the current path between the third portion 32c and the circuit portion 68. On the other hand, the phases of the bias magnetic fields acting on the first element 51 and the second element 52 are mutually reversed. Therefore, the orientation (the polarity) of the increase or decrease of the change with respect to the strain of the electrical resistance of the first element 51 is the reverse of the orientation (the polarity) of the increase or decrease of the change with respect to the strain of the electrical resistance of the second element 52.

For example, the signal that is obtained from the first element 51 and the signal that is obtained from the second element 52 are differentially amplified. Thereby, the signal that is obtained from the first element 51 and the signal that is obtained from the second element 52 are added and amplified. On the other hand, for example, the effects of a magnetic field (e.g., the geomagnetism, etc.) along the X-axis direction are, for example, canceled. The noise due to a disturbance magnetic field such as geomagnetism, etc., can be suppressed.

Figure 11:
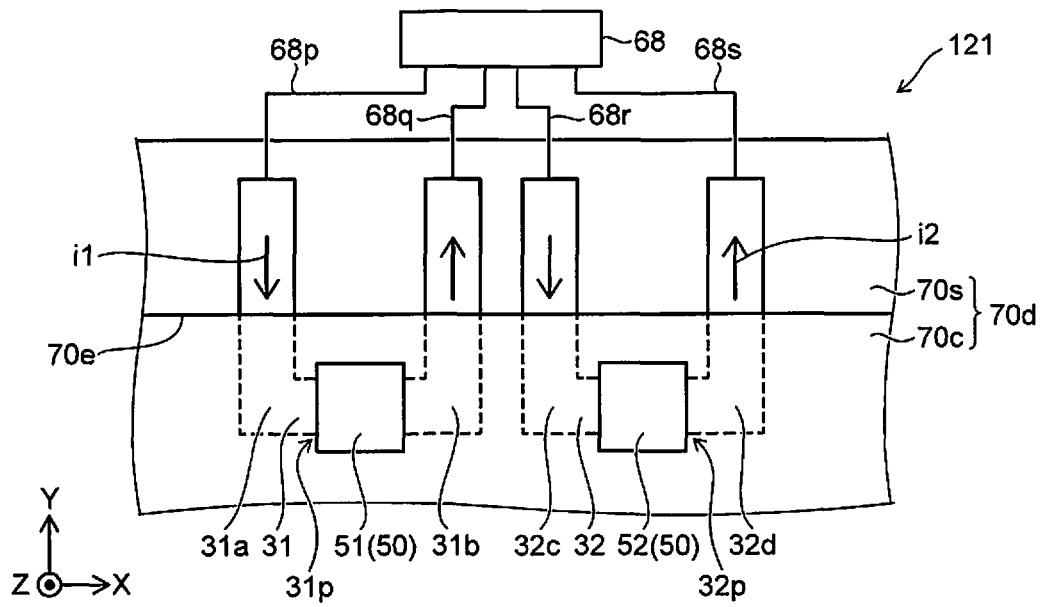
FIG. 11 is a schematic plan view illustrating a sensor according to the second embodiment.

FIG. 11 is a schematic plan view illustrating a sensor according to the second embodiment.

As shown in FIG. 11, the sensor 121 also includes the structure body 70d, the element portion 50, the first power line 31, and the second power line 32. The orientations of the first current i1 and the second current i2 in the sensor 121 are different from the orientations of the first current i1 and the second current i2 in the sensor 121. Otherwise, the configuration of the sensor 121 is similar to the configuration of the sensor 120.

In the sensor 121, for example, the second current i2 may flow from the third portion 32c toward the fourth portion 32d in at least a portion of a time when the first current i1 flows from the first portion 31a toward the second portion 31b. The second current i2 may flow from the fourth portion 32d toward the third portion 32c in at least a portion of a time when the first current i1 flows from the second portion 31b toward the first portion 31a.

For such orientations of the currents (phases of the alternating currents), the orientation of the magnetic field generated in the current path between the second portion 31b and the circuit portion 68 is the same as the orientation of the magnetic field generated in the current path between the third portion 32c and the circuit portion 68. On the other hand, the phases of the bias magnetic fields acting on the first element 51 and the second element 52 are the same. Therefore, the orientation (the polarity) of the increase or decrease of the change with respect to the strain of the electrical resistance of the first element 51 is the same as the orientation (the polarity) of the increase or decrease of the change with respect to the strain of the electrical resistance of the second element 52.

For example, the signal that is obtained from the first element 51 and the signal that is obtained from the second element 52 are processed by an in-phase circuit. Thereby, the signal that is obtained from the first element 51 and the signal that is obtained from the second element 52 are added and amplified. On the other hand, the component (e.g., the X-axis direction component) of the magnetic field generated by the first current i1 flowing in the second portion 31b and the component (e.g., the Y-axis direction component) of the magnetic field generated by the second current i2 flowing in the third portion 32c cancel each other. For example, unnecessary effects of the current-produced magnetic fields in the X-axis direction can be suppressed.

In the sensors 120 and 121, at least a portion of the film portion 70c may be provided between the first power line 31 and the first element 51 (e.g., referring to FIG. 6, etc.). In such a case, at least a portion of the film portion 70c may be provided between the second power line 32 and the second element 52.

In the sensors 120 and 121, the first element 51 may be provided between the film portion 70c and the first power line 31 (e.g., referring to FIG. 7, etc.). In such a case, the second element 52 may be provided between the film portion 70c and the second power line 32.

In the sensor 120, at least one of the first current i1 or the second current i2 may further include a direct current component (referring to the direct current component i30DC of FIG. 8) in addition to the alternating current component. A magnetic bias can be applied to the first magnetic layer 11 and the second magnetic layer 12 by the direct current component of the magnetic field obtained by the direct current component of the current. The orientations of the magnetizations of these magnetic layers can be tilted with respect to the Y-axis direction (the X-axis direction). High sensitivity is obtained easily.

The third to fourth magnetic layers described in reference to the first embodiment, etc., may be provided in the sensors 120 and 121. For example, magnetic biases can be applied to the first magnetic layer 11 and the second magnetic layer 12; and the orientations of the magnetizations can be tilted with respect to the Y-axis direction (the X-axis direction). High sensitivity is obtained easily.

Figure 12:
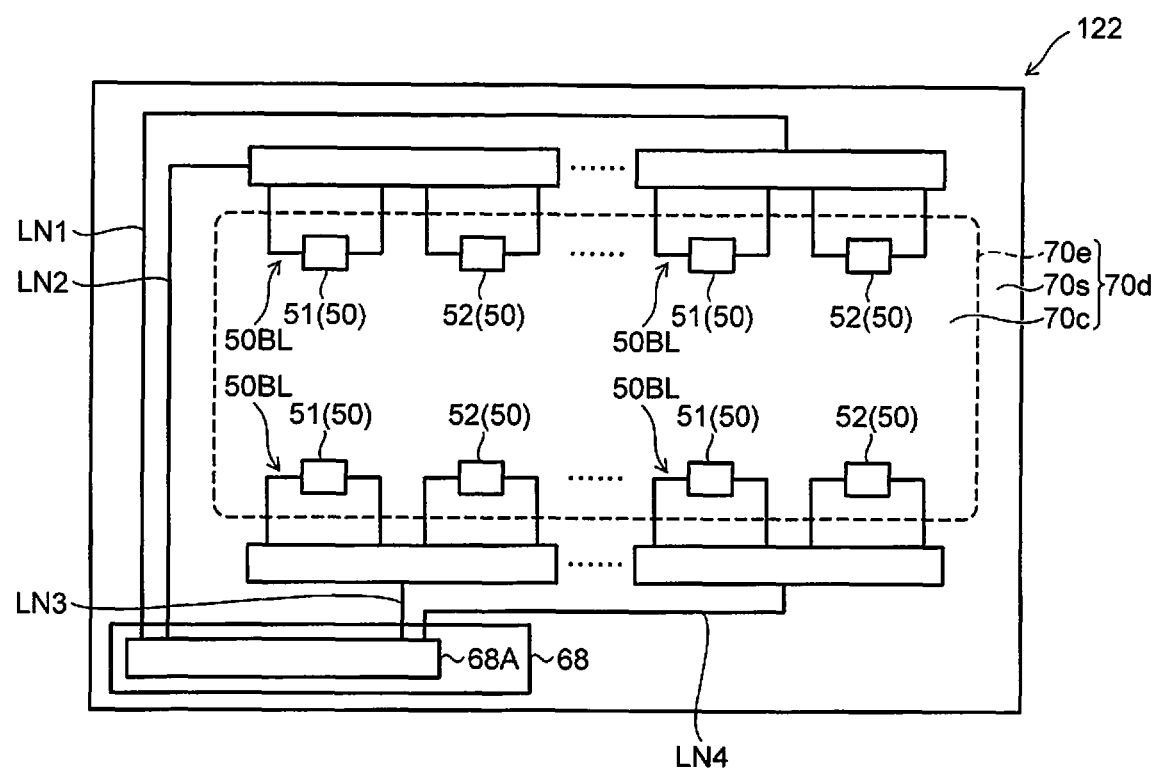
FIG. 12 is a schematic plan view illustrating a sensor according to the second embodiment.

FIG. 12 is a schematic plan view illustrating a sensor according to the second embodiment.

As shown in FIG. 12, multiple element blocks 50BL are provided in the sensor 122. The multiple element blocks 50BL are provided at the end portion 70e of the film portion 70c (e.g., the side). One example of the multiple element blocks 50BL corresponds to FIG. 10 and FIG. 11. For example, the multiple element blocks 50BL are electrically connected respectively to the circuit portion 68 by interconnects LN1 to LN4, etc.

For example, an adder 68A (an adder circuit) is provided in the circuit portion 68. The signals that are obtained from the interconnects LN1 to LN4, etc., are supplied to the adder 68A. For example, the signals that are obtained from the multiple element blocks 50BL are added in the adder 68A. Thereby, for example, a high SN ratio is obtained.

Figure 13A:
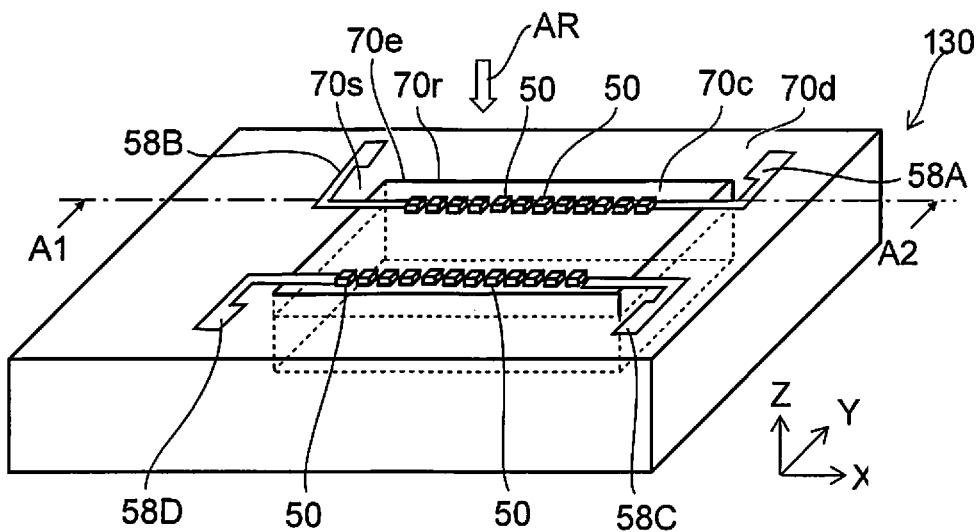
FIG. 13A to FIG. 13C are schematic views illustrating a sensor according to the embodiment.
Figure 13B:
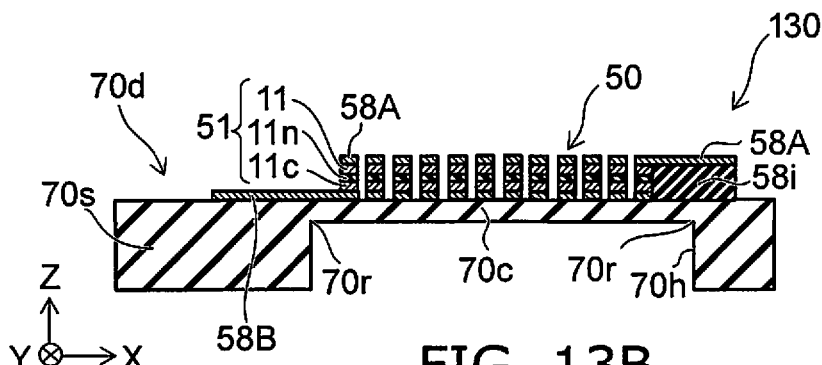
Figure 13C:
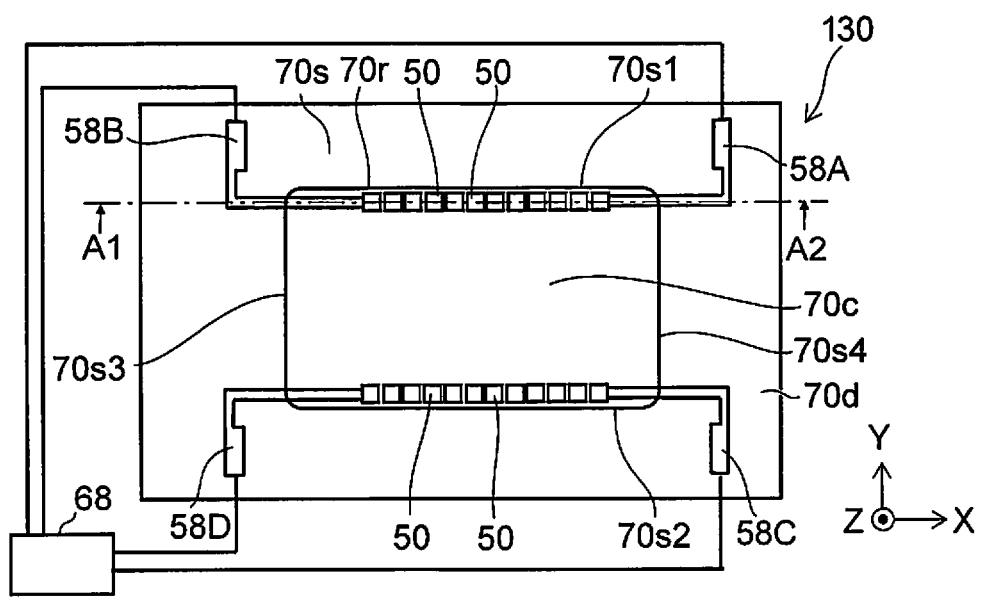

FIG. 13A to FIG. 13C are schematic views illustrating a sensor according to the embodiment.

FIG. 13A is a perspective view. FIG. 13B is a line A1-A2 cross-sectional view of FIG. 13A. FIG. 13C is a plan view as viewed along arrow AR of FIG. 13A.

As shown in FIG. 13A, the sensor 130 according to the embodiment includes the structure body 70d and the element portions 50.

The element portions 50 are fixed to the film portion 70c of the structure body 70d. In the example, a portion of the element portions 50 is fixed to a first position (a first region) of the film portion 70c. Another portion of the element portions 50 is fixed to a second position (a second region) of the film portion 70c.

In the example, a portion of the element portions 50 is arranged along the X-axis direction. The other portion of the element portions 50 also is arranged along the X-axis direction. The film portion 70c is held by the supporter 70s. The structure body 70d has an outer edge 70r. The outer edge 70r corresponds to the end portion 70e. The supporter 70s holds the outer edge 70r. For example, a substrate that is used to form the film portion 70c and the supporter 70s is provided. The substrate is, for example, a silicon substrate. A portion of the substrate is removed; and a hollow 70h is provided in the substrate (referring to FIG. 13B). The thin portion of the substrate is used to form the film portion 70c. The thick portion of the substrate is used to form the supporter 70s.

As shown in FIG. 13B, the first elements 51 (and the second elements 52, etc.) that are used as portions of the element portions 50 are provided. The first elements 51 (and the second elements 52, etc.) are provided between a conductive film 58A and a conductive film 58B or between a conductive film 58C and a conductive film 58D. These conductive films function as at least a portion of the electrodes, the terminals, and the interconnects.

In the example as shown in FIG. 13C, the film portion 70c (the outer edge 70r) is substantially a polygon (a quadrilateral, and specifically, a rectangle). The outer edge 70r of the film portion 70c includes a first side 70s1, a second side 70s2, a third side 70s3, and a fourth side 70s4.

Various configurations are applicable to the film portion 70c (the outer edge 70r). The film portion 70c (the outer edge 70r) may be, for example, substantially perfectly circular, flattened circular (including elliptical), substantially square, or rectangular. For example, in the case where the film portion 70c (the outer edge 70r) has a substantially square configuration or a substantially rectangular configuration, the portions at the four corners (the corner portions) may have curved configurations.

The first side 70s1 extends in the first direction (in the example, the X-axis direction). The second side 70s2 is separated from the first side 70s1 in the second direction. The second direction crosses the first direction. In the example, the second direction is the Y-axis direction. The second side 70s2 extends in the first direction (the X-axis direction). The third side 70s3 extends in the second direction (the Y-axis direction). The fourth side 70s4 is separated from the third side 70s3 in the first direction (the X-axis direction) and extends in the second direction (the Y-axis direction).

In the example, the distance along the first direction between the third side 70s3 and the fourth side 70s4 is longer than the distance along the second direction between the first side 70s1 and the second side 70s2. The film portion 70c is substantially a rectangle; and the first side 70s1 and the second side 70s2 are the long sides. The third side 70s3 and the fourth side 70s4 are the short sides.

A large strain (anisotropic strain) is generated at the vicinity of the outer edge 70r of the film portion 70c when stress is applied to the film portion 70c. By disposing the elements at the vicinity of the outer edge 70r, a large strain is applied to the elements; and high sensitivity is obtained.

In the example, the multiple elements (the first element 51, the second element 52, etc.) are arranged along the first side 70s1. Other multiple elements are arranged along the second side 70s2.

The SN ratio can be improved by connecting the multiple elements in series. In the embodiment, multiple elements that obtain electrical signals having the same polarity when the pressure is applied can be disposed. Thereby, the SN ratio improves.

In one example, for example, the sensor according to the embodiment is used as a microphone. In another example, the sensor according to the embodiment may be used as a magnetic field sensor.

The embodiment may include an electronic device. The electronic device includes, for example, the sensors according to the embodiments recited above and the sensors of the modifications of the embodiments. The electronic device includes, for example, an information terminal. The electronic device includes, for example, a microphone.

Figure 14:
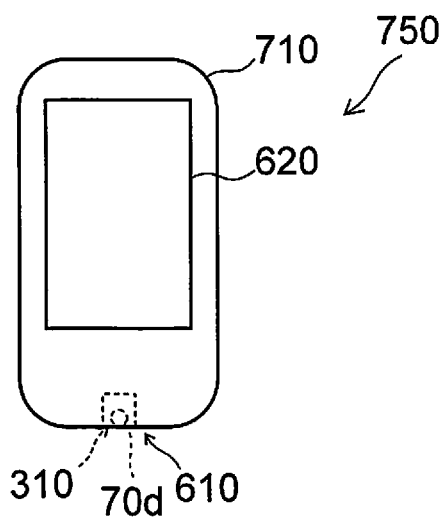
FIG. 14 is a schematic view illustrating an electronic device according to the embodiment.

FIG. 14 is a schematic view illustrating an electronic device according to the embodiment.

As shown in FIG. 14, the electronic device 750 according to the embodiment is, for example, an information terminal 710. For example, a microphone 610 is provided in the information terminal 710.

The microphone 610 includes, for example, a sensor 310. For example, the structure body 70d is substantially parallel to a surface where a displayer 620 of the information terminal 710 is provided. The arrangement of the structure body 70d is arbitrary. Any sensor described in reference to the embodiments recited above is applicable to the sensor 310.

Figures 15A, 15B:
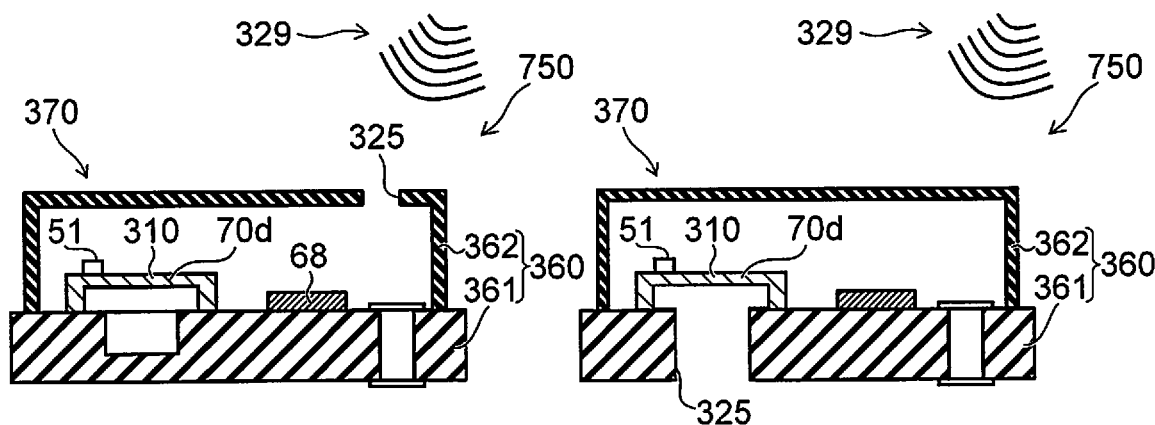
FIG. 15A to FIG. 15C are schematic cross-sectional views illustrating the electronic device according to the embodiment.
Figure 15C:
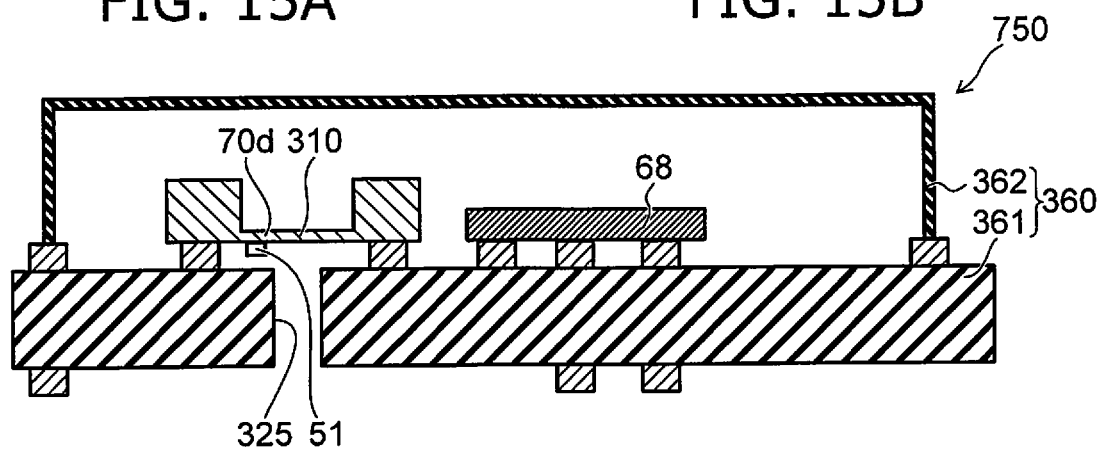

FIG. 15A to FIG. 15C are schematic cross-sectional views illustrating the electronic device according to the embodiment.

As shown in FIG. 15A and FIG. 15B, the electronic device 750 (e.g., a microphone 370 (an acoustic microphone)) includes a housing 360, a cover 362, and the sensor 310. The housing 360 includes, for example, a substrate 361 (e.g., a printed circuit board) and the cover 362. The substrate 361 includes, for example, a circuit such as an amplifier, etc.

An acoustic hole 325 is provided in the housing 360 (at least one of the substrate 361 or the cover 362). In the example shown in FIG. 15A, the acoustic hole 325 is provided in the cover 362. In the example shown in FIG. 15B, the acoustic hole 325 is provided in the substrate 361. Sound 329 passes through the acoustic hole 325 and enters the interior of the cover 362. The microphone 370 responds to the sound pressure.

For example, the sensor 310 is placed on the substrate 361; and an electrical signal line (not illustrated) is provided. The cover 362 is provided to cover the sensor 310. The housing 360 is provided around the sensor 310. At least a portion of the sensor 310 is provided inside the housing 360.

For example, the element portion 50 (the first element 51, etc.) and the structure body 70*d* are provided between the substrate 361 and the cover 362. For example, the sensor 310 is provided between the substrate 361 and the cover 362.

As shown in FIG. 15C, the acoustic hole 325 may be provided in the substrate 361. The first element 51 may be provided between the structure body 70*d* (e.g., the film portion 70*c*) and the substrate 361. The first element 51 may overlap the acoustic hole 325. The first element 51 may not overlap the acoustic hole 325.

The embodiments may include, for example, the following configurations (e.g., technological proposals).

Configuration 1

A sensor, comprising:
a structure body including a supporter and a film portion, the film portion being supported by the supporter and including an end portion, the end portion being aligned with a first direction and supported by the supporter;
an element portion including a first element provided at the film portion, the first element including a first magnetic layer, a first opposing magnetic layer provided between the first magnetic layer and the film portion, and a first nonmagnetic layer provided between the first magnetic layer and the first opposing magnetic layer, a second direction from the first opposing magnetic layer toward the first magnetic layer crossing the first direction; and
a power line electrically insulated from the element portion, the power line including a portion aligned with the first direction, a direction from the aligned portion of the power line toward the first element being aligned with the second direction.

Configuration 2

The sensor according to Configuration 1, wherein at least a portion of the film portion is provided between the power line and the first element.

Configuration 3

The sensor according to Configuration 1, wherein the first element is provided between the film portion and the power line.

Configuration 4

The sensor according to any one of Configurations 1 to 3, further comprising a circuit portion electrically connected to the power line, the circuit portion supplying a current to the power line, the current having an alternating current component having a first frequency.

Configuration 5

The sensor according to Configuration 4, wherein
the circuit portion also is electrically connected to the element portion, and
the circuit portion is configured to output a third signal based on a first signal and a second signal, the first signal relating to the first frequency, the second signal being obtained from the element portion.

Configuration 6

The sensor according to Configuration 5, wherein the first frequency is higher than a frequency of a deformation of the film portion.

Configuration 7

The sensor according to Configuration 5 or 6, wherein
the second signal is a signal modulated by a deformation of the film portion, and
the circuit portion outputs the third signal by demodulating the second signal.

Configuration 8

The sensor according to any one of Configurations 5 to 7, wherein the current also has a direct current component.

Configuration 9

The sensor according to any one of Configurations 5 to 8, wherein
the element portion further includes a second element provided at the film portion,
the second element includes a second magnetic layer, a second opposing magnetic layer provided between the second magnetic layer and the film portion, and a second nonmagnetic layer provided between the second magnetic layer and the second opposing magnetic layer,
a direction from the second opposing magnetic layer toward the second magnetic layer is aligned with the second direction,
a direction from the first element toward the second element is aligned with the first direction,
a direction from the aligned portion of the power line toward the second element is aligned with the second direction, and
the second signal is obtained from the first element and the second element.

Configuration 10

The sensor according to Configuration 9, wherein the second element is connected in series to the first element.

Configuration 11

A sensor, comprising:
a structure body including a supporter and a film portion, the film portion being supported by the supporter and including an end portion, the end portion being aligned with a first direction and supported by the supporter;
an element portion including a first element and a second element provided at the film portion, the first element including a first magnetic layer, a first opposing magnetic layer provided between the first magnetic layer and the film portion, and a first nonmagnetic layer provided between the first magnetic layer and the first opposing magnetic layer, a second direction from the first opposing magnetic layer toward the first magnetic layer crossing the first direction, the second element including a second magnetic layer, a second opposing magnetic layer provided between the second magnetic layer and the film portion, and a second nonmagnetic layer provided between the second magnetic layer and the second opposing magnetic layer, a direction from the second opposing magnetic layer toward the second magnetic layer being aligned with the second direction, a direction from the first element toward the second element being aligned with the first direction; and
a first power line and a second power line electrically insulated from the element portion,
a direction from a part of the first power line toward the first element being aligned with the second direction,
a direction from a part of the second power line toward the second element being aligned with the second direction,
the part of the first power line and the part of the second power line being aligned with the first direction.

Configuration 12

The sensor according to Configuration 11, further comprising a circuit portion electrically connected to the first power line and the second power line,
the circuit portion supplying a first current having an alternating current component to the first power line,
the circuit portion supplying a second current having an alternating current component to the second power line.

Configuration 13

The sensor according to Configuration 12, wherein
the first power line includes a first portion and a second portion, a direction from the first portion toward the second portion being aligned with the first direction, the second power line includes a third portion and a fourth portion, a direction from the third portion toward the fourth portion being aligned with the first direction, the second portion is provided between the first portion and the fourth portion, the third portion is provided between the second portion and the fourth portion, the part of the first power line is between the first portion and the second portion, the part of the second power line is between the third portion and the fourth portion, the second current flows from the fourth portion toward the third portion in at least a portion of a time when the first current flows from the first portion toward the second portion, and the second current flows from the third portion toward the fourth portion in at least a portion of a time when the first current flows from the second portion toward the first portion.

Configuration 14

The sensor according to Configuration 12 or 13, wherein at least one of the first current or the second current also has a direct current component.

Configuration 15

The sensor according to any one of Configurations 11 to 13, wherein at least a portion of the film portion is provided between the first power line and the first element.

Configuration 16

The sensor according to any one of Configurations 1 to 15, wherein the first element further includes a third magnetic layer, the first magnetic layer is provided between the third magnetic layer and the first opposing magnetic layer, the third magnetic layer includes at least one of a first material or a second material, the first material including at least one selected from the group consisting of Ir—Mn, Pt—Mn, Pd—Pt—Mn, and Ru—Rh—Mn, the second material including at least one of CoPt (a ratio of Co being not less than 50 at. % and not more than 85 at. %), $(Co_{x1}Pt_{100-x1})_{100-y1}Cr_{y1}$ (x1 being not less than 50 at. % and not more than 85 at. %, and y1 being not less than 0 at. % and not more than 40 at. %), or FePt (a ratio of Pt being not less than 40 at. % and not more than 60 at. %).

Configuration 17

The sensor according to Configuration 16, wherein the first element further includes a fourth magnetic layer, and the fourth magnetic layer is provided between the third magnetic layer and the first magnetic layer.

Configuration 18

The sensor according to Configuration 16 or 17, wherein a magnetization of the first magnetic layer is tilted with respect to the first direction.

Configuration 19

The sensor according to Configuration 11 or 12, wherein the first element further includes a fifth magnetic layer, the first opposing magnetic layer is provided between the fifth magnetic layer and the third magnetic layer, the first magnetic layer is provided between the first opposing magnetic layer and the third magnetic layer, the fourth magnetic layer is provided between the first magnetic layer and the third magnetic layer, and the fifth magnetic layer includes at least one of a third material or a fourth material, the third material including at least one selected from the group consisting of Ir—Mn, Pt—Mn, Pd—Pt—Mn, and Ru—Rh—Mn, the fourth material including at least one of CoPt (a ratio of Co being not less than 50 at. % and not more than 85 at. %), $(Co_{x2}Pt_{100-x2})_{100-y2}Cr_{y2}$ (x2 being not less than 50 at. % and not more than 85 at. %, and y2 being not less than 0 at. % and not more than 40 at. %), or FePt (a ratio of Pt being not less than 40 at. % and not more than 60 at. %).

Configuration 20

The sensor according to Configuration 19, wherein a magnetization of the first opposing magnetic layer is aligned with the first direction.

According to the embodiments, a sensor is provided in which the noise can be reduced.

In the specification of the application, "perpendicular" and "parallel" refer to not only strictly perpendicular and strictly parallel but also include, for example, the fluctuation due to manufacturing processes, etc. It is sufficient to be substantially perpendicular and substantially parallel.

Hereinabove, exemplary embodiments of the invention are described with reference to specific examples. However, the embodiments of the invention are not limited to these specific examples. For example, one skilled in the art may similarly practice the invention by appropriately selecting specific configurations of components included in sensors such as structure bodies, element portions, elements, magnetic layers, intermediate layers, electrodes, film portions, supporters, power lines, circuit portions, etc., from known art. Such practice is included in the scope of the invention to the extent that similar effects thereto are obtained.

Further, any two or more components of the specific examples may be combined within the extent of technical feasibility and are included in the scope of the invention to the extent that the purport of the invention is included.

Moreover, all sensors practicable by an appropriate design modification by one skilled in the art based on the sensors described above as embodiments of the invention also are within the scope of the invention to the extent that the spirit of the invention is included.

Various other variations and modifications can be conceived by those skilled in the art within the spirit of the invention, and it is understood that such variations and modifications are also encompassed within the scope of the invention.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the invention.

What is claimed is:

1. A sensor, comprising:
a structure body comprising a supporter and a film portion, the film portion being supported by the supporter and comprising an end portion, the end portion being aligned with a first direction and supported by the supporter;
an element portion comprising a first element provided at the film portion, the first element comprising:
a first magnetic layer;
a first opposing magnetic layer provided between the first magnetic layer and the film portion;
a first nonmagnetic layer provided between the first magnetic layer and the first opposing magnetic layer, a second direction from the first opposing magnetic layer toward the first magnetic layer crossing the first direction; and an electrode; and a power line electrically insulated from the element portion, the power line comprising a portion aligned with the first direction, a direction from the aligned portion of the power line toward the first element being aligned with the second direction;

wherein the first opposing magnetic layer is on a first side of the electrode in the second direction, and the film portion and the power line are on a second side of the electrode in the second direction.

2. The sensor according to claim 1, wherein at least a portion of the film portion is provided between the power line and the first element.

3. The sensor according to claim 1, wherein the first element is provided between the film portion and the power line.

4. The sensor according to claim 1, further comprising a circuit portion electrically connected to the power line, the circuit portion supplying a current to the power line, the current having an alternating current component having a first frequency.

5. The sensor according to claim 4, wherein:
the circuit portion is electrically connected to the element portion; and
the circuit portion is configured to output a third signal based on a first signal and a second signal, the first signal relating to the first frequency and the second signal being obtained from the element portion.

6. The sensor according to claim 5, wherein the first frequency is higher than a frequency of a deformation of the film portion.

7. The sensor according to claim 5, wherein
the second signal is a signal modulated by a deformation of the film portion; and
the circuit portion outputs the third signal by demodulating the second signal.

8. The sensor according to claim 5, wherein the current comprises a direct current component.

9. The sensor according to claim 5, wherein:
the element portion further comprises a second element provided at the film portion;
the second element comprises:
a second magnetic layer;
a second opposing magnetic layer provided between the second magnetic layer and the film portion; and
a second nonmagnetic layer provided between the second magnetic layer and the second opposing magnetic layer;
a direction from the second opposing magnetic layer toward the second magnetic layer is aligned with the second direction;
a direction from the first element toward the second element is aligned with the first direction;
a direction from the aligned portion of the power line toward the second element is aligned with the second direction; and
the second signal is obtained from the first element and the second element.

10. The sensor according to claim 9, wherein the second element is connected in series to the first element.

11. A sensor, comprising:
a structure body comprising a supporter and a film portion, the film portion being supported by the supporter and including an end portion, the end portion being aligned with a first direction and supported by the supporter;

an element portion comprising a first element and a second element provided at the film portion, the first element comprising:
a first magnetic layer;
a first opposing magnetic layer provided between the first magnetic layer and the film portion; and
a first nonmagnetic layer provided between the first magnetic layer and the first opposing magnetic layer, a second direction from the first opposing magnetic layer toward the first magnetic layer crossing the first direction, the second element including a second magnetic layer, a second opposing magnetic layer provided between the second magnetic layer and the film portion, and a second nonmagnetic layer provided between the second magnetic layer and the second opposing magnetic layer, a direction from the second opposing magnetic layer toward the second magnetic layer being aligned with the second direction, a direction from the first element toward the second element being aligned with the first direction; and a first power line and a second power line electrically insulated from the element portion, a direction from a part of the first power line toward the first element being aligned with the second direction, a direction from a part of the second power line toward the second element being aligned with the second direction, and the part of the first power line and the part of the second power line being aligned with the first direction.

12. The sensor according to claim 11, further comprising a circuit portion electrically connected to the first power line and the second power line, the circuit portion supplying a first current having an alternating current component to the first power line and supplying a second current having an alternating current component to the second power line.

13. The sensor according to claim 12, wherein:
the first power line comprises a first portion and a second portion, a direction from the first portion toward the second portion being aligned with the first direction;
the second power line comprises a third portion and a fourth portion, a direction from the third portion toward the fourth portion being aligned with the first direction;
the second portion is provided between the first portion and the fourth portion;
the third portion is provided between the second portion and the fourth portion;
the part of the first power line is between the first portion and the second portion;
the part of the second power line is between the third portion and the fourth portion;
the second current flows from the fourth portion toward the third portion in at least a portion of a time when the first current flows from the first portion toward the second portion; and
the second current flows from the third portion toward the fourth portion in at least a portion of a time when the first current flows from the second portion toward the first portion.

14. The sensor according to claim 12, wherein at least one of the first current or the second current also has a direct current component.

15. The sensor according to claim 11, wherein at least a portion of the film portion is provided between the first power line and the first element.

16. The sensor according to claim 1, wherein:
the first element further comprises a third magnetic layer;
the first magnetic layer is provided between the third magnetic layer and the first opposing magnetic layer; and
the third magnetic layer comprises at least one of a first material or a second material, the first material comprising at least one selected from the group consisting of Ir—Mn, Pt—Mn, Pd—Pt—Mn, and Ru—Rh—Mn, the second material comprising at least one of CoPt where a ratio of Co is not less than 50 at. % and not more than 85 at. %, $(Co_{x1}Pt_{100-x1})_{100-y1}Cr_{y1}$ where x1 is not less than 50 at. % and not more than 85 at. %, and y1 is not less than 0 at. % and not more than 40 at. %, or FePt where a ratio of Pt is not less than 40 at. % and not more than 60 at. %.

17. The sensor according to claim 16 wherein:
the first element further comprises a fourth magnetic layer; and
the fourth magnetic layer is provided between the third magnetic layer and the first magnetic layer.

18. The sensor according to claim 16, wherein a magnetization of the first magnetic layer is tilted with respect to the first direction.

19. The sensor according to claim 11, wherein:
the first element further comprises a fifth magnetic layer;
the first opposing magnetic layer is provided between the fifth magnetic layer and the third magnetic layer;
the first magnetic layer is provided between the first opposing magnetic layer and the third magnetic layer;
the fourth magnetic layer is provided between the first magnetic layer and the third magnetic layer; and
the fifth magnetic layer comprises at least one of a third material or a fourth material, the third material comprising at least one selected from the group consisting of Ir—Mn, Pt—Mn, Pd—Pt—Mn, and Ru—Rh—Mn, the fourth material comprising at least one of CoPt where a ratio of Co in not less than 50 at. % and not more than 85 at. %, $(Co_{x2}Pt_{100-x2})_{100-y2}Cr_{y2}$ where x2 is not less than 50 at. % and not more than 85 at. %, and y2 is not less than 0 at. % and not more than 40 at. %, or FePt where a ratio of Pt is not less than 40 at. % and not more than 60 at. %.

20. The sensor according to claim 19, wherein a magnetization of the first opposing magnetic layer is aligned with the first direction.

* * * * *

UNITED STATES PATENT AND TRADEMARK OFFICE
CERTIFICATE OF CORRECTION

PATENT NO. : 11,137,281 B2
APPLICATION NO. : 16/281157
DATED : October 5, 2021
INVENTOR(S) : Higashi et al.

It is certified that error appears in the above-identified patent and that said Letters Patent is hereby corrected as shown below:

In the Claims

Claim 19, Column 24, Line 14, "in not less than" should read --is not less than--.

Signed and Sealed this
Twenty-fourth Day of May, 2022

Katherine Kelly Vidal
*Director of the United States Patent and Trademark Office*